US007651541B2

(12) United States Patent
Hundley et al.

(10) Patent No.: US 7,651,541 B2
(45) Date of Patent: Jan. 26, 2010

(54) CHEMICAL CHANGE AGENT

(75) Inventors: Joseph W. Hundley, Martinsville, VA (US); Steven A. Dunwoody, Castle Hayne, NC (US)

(73) Assignee: State Line Holdings, LLC, Ridgeway, VA (US)

( * ) Notice: Subject to any disclaimer, the term of this patent is extended or adjusted under 35 U.S.C. 154(b) by 486 days.

(21) Appl. No.: 10/790,545

(22) Filed: Mar. 1, 2004

(65) Prior Publication Data

US 2004/0168365 A1 Sep. 2, 2004

Related U.S. Application Data

(63) Continuation-in-part of application No. 10/086,902, filed on Mar. 1, 2002, now Pat. No. 6,860,911, which is a continuation-in-part of application No. 09/757,765, filed on Jan. 10, 2001, now Pat. No. 6,740,133.

(60) Provisional application No. 60/451,590, filed on Mar. 3, 2003, provisional application No. 60/490,995, filed on Jul. 29, 2003.

(51) Int. Cl.
*C10L 1/32* (2006.01)
*C10L 5/00* (2006.01)
*C10L 10/00* (2006.01)
(52) U.S. Cl. .............. 44/301; 44/603; 44/620; 44/628
(58) Field of Classification Search .......... 44/301, 44/603, 641, 620, 628
See application file for complete search history.

(56) References Cited

U.S. PATENT DOCUMENTS

| 3,281,318 | A | * | 10/1966 | Stutz .................. 514/737 |
| 3,346,487 | A | * | 10/1967 | Irani et al. ............ 507/128 |
| 3,898,076 | A | | 8/1975 | Ranke |
| 3,935,021 | A | | 1/1976 | Greve et al. |
| 4,183,757 | A | * | 1/1980 | Groszek et al. ........ 106/14.11 |
| 4,741,278 | A | * | 5/1988 | Franke et al. ........... 110/342 |
| 4,824,441 | A | * | 4/1989 | Kindig .................. 44/604 |
| 5,437,722 | A | | 8/1995 | Borenstein |
| 5,578,239 | A | | 11/1996 | Bennett |
| 6,206,685 | B1 | | 3/2001 | Zamansky et al. |
| 6,471,506 | B1 | | 10/2002 | Zamansky et al. |
| 6,860,911 | B2 | * | 3/2005 | Hundley ................. 44/620 |
| 2005/0202989 | A1 | * | 9/2005 | Wilson .................. 510/245 |

OTHER PUBLICATIONS

Lissianski et al, "Effect of Metal-Containing Additives on $NO_x$ Reduction in Combustion and Reburning", 2001, pp. 1118-1127, vol. 125, No. 3, Combustion and Flame.

* cited by examiner

*Primary Examiner*—Cephia D Toomer
(74) *Attorney, Agent, or Firm*—B. Aaron Schulman; Stites & Harbison PLLC

(57) ABSTRACT

The present invention relates to a chemical change reagent which is used as an additive to coal to enhance the complete combustion of the coal after turning it into a synthetic fuel. The composition is a chemical change agent in that it converts the coal/composition mix into a different material which, when burned, results in lower NOx emissions. The composition includes a wax, a base for ph adjustment and water and is mixed with the coal prior to combustion.

27 Claims, 13 Drawing Sheets

FIG 7A

NBP CEM Hourly Data Summary

Period: 07/16/03 00:00:59 To 07/17/03 23:59:59, Records = 34

| Date | Hour | PC | Unit Oper (Hr) | Total Steam klb/hr | Load Bin | NOx Lbs | Heat Input MBtu | NOx lb/mBtu Adj | Mthd | Avail | Bias | Stack Flow (scfh) Adj | Mthd | Avail | Bias | NOx ppm | MC | Mthd | % CO2 | CO2 MC | Mthd | Oper Min. | Fuel Factor |
|---|---|---|---|---|---|---|---|---|---|---|---|---|---|---|---|---|---|---|---|---|---|---|---|
| 07/16/03 | 0 | 08 | 1.00 | 84 | 5 | 0.620 | 234.0 | 0.620 | 01 | 0.0 | 1.000 | 3828000 | 01 | 0.0 | 1.000 | 317.4 | 00 | 01 | 11.0 | 00 | 00 | 60 | 1800 |
| 07/16/03 | 1 | 08 | 1.00 | 80 | 5 | 0.640 | 225.0 | 0.640 | 01 | 0.0 | 1.000 | 3756000 | 01 | 0.0 | 1.000 | 321.8 | 00 | 01 | 10.8 | 00 | 00 | 60 | 1800 |
| 07/16/03 | 2 | 08 | 1.00 | 79 | 5 | 0.687 | 228.0 | 0.687 | 01 | 0.0 | 1.000 | 3864000 | 01 | 0.0 | 1.000 | 338.9 | 00 | 01 | 10.6 | 00 | 00 | 60 | 1800 |
| 07/16/03 | 3 | 08 | 1.00 | 83 | 5 | 0.693 | 234.0 | 0.693 | 01 | 0.0 | 1.000 | 3966000 | 01 | 0.0 | 1.000 | 341.9 | 00 | 01 | 10.6 | 00 | 00 | 60 | 1800 |
| 07/16/03 | 4 | 08 | 1.00 | 84 | 5 | 0.671 | 238.0 | 0.671 | 01 | 0.0 | 1.000 | 3960000 | 01 | 0.0 | 1.000 | 337.3 | 00 | 01 | 10.8 | 00 | 00 | 60 | 1800 |
| 07/16/03 | 5 | 08 | 1.00 | 81 | 5 | 0.722 | 231.0 | 0.722 | 01 | 0.0 | 1.000 | 3960000 | 01 | 0.0 | 1.000 | 352.9 | 00 | 01 | 10.5 | 00 | 00 | 60 | 1800 |
| 07/16/03 | 6 | 08 | 1.00 | 98 | 6 | 0.989 | 278.0 | 0.989 | 01 | 0.0 | 1.000 | 4962000 | 01 | 0.0 | 1.000 | 464.6 | 00 | 01 | 10.1 | 00 | 00 | 60 | 1800 |
| 07/16/03 | 7 | 08 | 1.00 | 79 | 5 | 0.767 | 214.0 | 0.767 | 01 | 0.0 | 1.000 | 3852000 | 01 | 0.0 | 1.000 | 357.1 | 00 | 01 | 10.0 | 00 | 00 | 60 | 1800 |
| 07/16/03 | 8 | 08 | 1.00 | 78 | 5 | 0.656 | 219.0 | 0.656 | 01 | 0.0 | 1.000 | 3798000 | 01 | 0.0 | 1.000 | 317.4 | 00 | 01 | 10.4 | 00 | 00 | 60 | 1800 |
| 07/16/03 | 9 | 08 | 1.00 | 80 | 5 | 0.622 | 220.0 | 0.622 | 01 | 0.0 | 1.000 | 4116000 | 01 | 0.0 | 1.000 | 277.9 | 00 | 01 | 9.6 | 00 | 00 | 60 | 1800 |
| 07/16/03 | 10 | 08 | 1.00 | 79 | 5 | 0.595 | 223.0 | 0.595 | 01 | 0.0 | 1.000 | 4050000 | 01 | 0.0 | 1.000 | 274.3 | 00 | 01 | 9.9 | 00 | 00 | 60 | 1800 |
| 07/16/03 | 11 | 08 | 1.00 | 80 | 5 | 0.577 | 230.0 | 0.577 | 01 | 0.0 | 1.000 | 4020000 | 01 | 0.0 | 1.000 | 276.6 | 00 | 01 | 10.3 | 00 | 00 | 60 | 1800 |
| 07/16/03 | 12 | 08 | 1.00 | 80 | 5 | 0.589 | 232.0 | 0.589 | 01 | 0.0 | 1.000 | 4050000 | 01 | 0.0 | 1.000 | 282.4 | 00 | 01 | 10.3 | 00 | 00 | 60 | 1800 |
| 07/16/03 | 13 | 08 | 1.00 | 80 | 5 | 0.586 | 235.0 | 0.586 | 01 | 0.0 | 1.000 | 4068000 | 01 | 0.0 | 1.000 | 283.4 | 00 | 01 | 10.4 | 00 | 00 | 60 | 1800 |
| 07/16/03 | 14 | 08 | 1.00 | 79 | 5 | 0.594 | 234.0 | 0.594 | 01 | 0.0 | 1.000 | 4098000 | 01 | 0.0 | 1.000 | 284.8 | 00 | 01 | 10.3 | 00 | 00 | 60 | 1800 |
| 07/16/03 | 15 | 08 | 1.00 | 81 | 5 | 0.588 | 240.0 | 0.588 | 01 | 0.0 | 1.000 | 4194000 | 01 | 0.0 | 1.000 | 281.9 | 00 | 01 | 10.3 | 00 | 00 | 60 | 1800 |
| 07/16/03 | 16 | 08 | 1.00 | 81 | 5 | 0.581 | 253.0 | 0.581 | 01 | 0.0 | 1.000 | 4470000 | 01 | 0.0 | 1.000 | 275.7 | 00 | 01 | 10.2 | 00 | 00 | 60 | 1800 |
| 07/16/03 | 17 | 08 | 1.00 | 80 | 5 | 0.598 | 227.0 | 0.598 | 01 | 0.0 | 1.000 | 4050000 | 01 | 0.0 | 1.000 | 281.1 | 00 | 01 | 10.1 | 00 | 00 | 60 | 1800 |
| 07/16/03 | 18 | 08 | 1.00 | 80 | 5 | 0.594 | 230.0 | 0.594 | 01 | 0.0 | 1.000 | 4056000 | 01 | 0.0 | 1.000 | 282.1 | 00 | 01 | 10.2 | 00 | 00 | 60 | 1800 |
| 07/16/03 | 19 | 08 | 1.00 | 82 | 5 | 0.579 | 235.0 | 0.579 | 01 | 0.0 | 1.000 | 4056000 | 01 | 0.0 | 1.000 | 280.4 | 00 | 01 | 10.4 | 00 | 00 | 60 | 1800 |
| 07/16/03 | 20 | 08 | 1.00 | 81 | 5 | 0.588 | 233.0 | 0.588 | 01 | 0.0 | 1.000 | 4068000 | 01 | 0.0 | 1.000 | 282.0 | 00 | 01 | 10.3 | 00 | 00 | 60 | 1800 |
| 07/16/03 | 21 | 08 | 1.00 | 81 | 5 | 0.596 | 233.0 | 0.596 | 01 | 0.0 | 1.000 | 4068000 | 01 | 0.0 | 1.000 | 285.8 | 00 | 01 | 10.3 | 00 | 00 | 60 | 1800 |
| 07/16/03 | 22 | 08 | 1.00 | 80 | 5 | 0.604 | 232.0 | 0.604 | 01 | 0.0 | 1.000 | 4062000 | 01 | 0.0 | 1.000 | 289.6 | 00 | 01 | 10.3 | 00 | 00 | 60 | 1800 |
| 07/16/03 | 23 | 08 | 1.00 | 79 | 5 | 0.589 | 225.0 | 0.589 | 01 | 0.0 | 1.000 | 4014000 | 01 | 0.0 | 1.000 | 276.7 | 00 | 01 | 10.1 | 00 | 00 | 60 | 1800 |
| 07/17/03 | 0 | 08 | 1.00 | 80 | 5 | 0.580 | 227.0 | 0.580 | 01 | 0.0 | 1.000 | 3960000 | 01 | 0.0 | 1.000 | 277.9 | 00 | 01 | 10.3 | 00 | 00 | 60 | 1800 |
| 07/17/03 | 1 | 08 | 1.00 | 80 | 5 | 0.583 | 230.0 | 0.583 | 01 | 0.0 | 1.000 | 3978000 | 01 | 0.0 | 1.000 | 282.0 | 00 | 01 | 10.3 | 00 | 00 | 60 | 1800 |
| 07/17/03 | 2 | 08 | 1.00 | 79 | 5 | 0.592 | 227.0 | 0.592 | 01 | 0.0 | 1.000 | 3972000 | 01 | 0.0 | 1.000 | 283.6 | 00 | 01 | 10.3 | 00 | 00 | 60 | 1800 |
| 07/17/03 | 3 | 08 | 1.00 | 88 | 5 | 0.577 | 251.0 | 0.577 | 01 | 0.0 | 1.000 | 4260000 | 01 | 0.0 | 1.000 | 284.6 | 00 | 01 | 10.6 | 00 | 00 | 60 | 1800 |
| 07/17/03 | 4 | 08 | 1.00 | 89 | 5 | 0.577 | 255.0 | 0.577 | 01 | 0.0 | 1.000 | 4290000 | 01 | 0.0 | 1.000 | 287.5 | 00 | 01 | 10.7 | 00 | 00 | 60 | 1800 |
| 07/17/03 | 5 | 08 | 1.00 | 82 | 5 | 0.607 | 235.0 | 0.607 | 01 | 0.0 | 1.000 | 4068000 | 01 | 0.0 | 1.000 | 293.6 | 00 | 01 | 10.4 | 00 | 00 | 60 | 1800 |
| 07/17/03 | 6 | 08 | 1.00 | 80 | 5 | 0.603 | 238.0 | 0.603 | 01 | 0.0 | 1.000 | 4038000 | 01 | 0.0 | 1.000 | 297.2 | 00 | 01 | 10.6 | 00 | 00 | 60 | 1800 |
| 07/17/03 | 7 | 08 | 1.00 | 80 | 5 | 0.613 | 252.0 | 0.613 | 01 | 0.0 | 1.000 | 4368000 | 01 | 0.0 | 1.000 | 296.5 | 00 | 01 | 10.4 | 00 | 00 | 60 | 1800 |

PC - Process Codes:
01 - Changing Fuels
02 - Control Equipment Malfunction
03 - Startup
04 - Shutdown
05 - Process Down
06 - Clean Process Equipment
07 - Clean Control Equipment
08 - Normal Operation
09 - Other

MC - Monitoring Codes:
00 - Data Valid
10 - Required Adjustment Not Made
11 - Excess Drift Primary Analyzer
12 - Excess Drift Ancillary Analyzer
13 - Process Down
14 - Recalibration
15 - Preventive Maintenance
16 - Primary Analyzer Malfunction
17 - Ancillary Analyzer Malfunction
18 - Data Handling System Malfunction
19 - Sample Interface Malfunction
20 - Corrective Maintenance
21 - Blowback
22 - Analyzer Under/Over Range
98 - Automatic Calibration
99 - Software Adjust

PTS - Method Codes:
01 - Primary Monitoring System
Greater than 01 indicates the
Data Substitution Method used

FIG 7B

| Date | Hour | PC | Oper (Hr) | Steam klb/hr | Load Bin | NOx Lbs | Heat Input MBtu | NOx lb/mBtu Adj. | Mthd | Avail | Bias | Stack Flow (scfh) Adj. | Mthd | Avail | Bias | NOx ppm | MC | Mthd | CO2 % CO2 | MC | Mthd | Oper Min. | Fuel Factor |
|---|---|---|---|---|---|---|---|---|---|---|---|---|---|---|---|---|---|---|---|---|---|---|---|
| 07/17/03 | 8 | 08 | 1.00 | 80 | 5 | 0.589 | 222.0 | 0.589 | 01 | 0.0 | 1.000 | 3954000 | 01 | 0.0 | 1.000 | 276.9 | 00 | 01 | 10.1 | 00 | 00 | 60 | 1800 |
| 07/17/03 | 9 | 08 | 1.00 | 81 | 5 | 0.587 | 232.0 | 0.587 | 01 | 0.0 | 1.000 | 4098000 | 01 | 0.0 | 1.000 | 278.4 | 00 | 01 | 10.2 | 00 | 00 | 60 | 1800 |
| Report Average: | | | | 81 | | 0.625 | 234 | 0.625 | | | | 4070118 | | | | 300.7 | | | 10.3 | | | | |
| Report Max Values: | | | | 98 | | 0.989 | 278 | 0.989 | | | | 4962000 | | | | 464.6 | | | 11.0 | | | | |

PC - Process Codes:
01 - Changing Fuels
02 - Control Equipment Malfunction
03 - Startup
04 - Shutdown
05 - Process Down
06 - Clean Process Equipment
07 - Clean Control Equipment
08 - Normal Operation
09 - Other MC - Monitoring Codes:
00 - Data Valid
10 - Required Adjustment Not Made
11 - Excess Drift Primary Analyzer
12 - Excess Drift Ancillary Analyzer
13 - Process Down
14 - Recalibration
15 - Preventive Maintenance
16 - Primary Analyzer Malfunction
17 - Ancillary Analyzer Malfunction
18 - Data Handling System Malfunction
19 - Sample Interface Malfunction
20 - Corrective Maintenance
21 - Blowback
22 - Analyzer Under/Over Range
98 - Automatic Calibration
99 - Software Adjust P75 - Method Codes:
01 - Primary Monitoring System
Greater than 01 indicates the
Data Substitution Method used Report printed on: 07/17/03 10:21:05

C:\CEMLink\eports\s1_Hour751.frx

Page 2

NBP CEM: Hourly Data Summary

Period: 07/16/03 00:00:59 To 07/17/03 23:59:59, Records = 34

| Date | Hour | PC | Unit Oper (Hr) | Total Steam klb/hr | Load Bin | NOx Lbs | Heat Input MBtu | NOx lb/mBtu Adj | Mthd | Avail | Bias | Stack Flow (scfh) Adj | Mthd | Avail | Bias | NOx ppm | MC | Mthd | CO2 % CO2 | MC | Mthd | Oper Min. | Fuel Factor |
|---|---|---|---|---|---|---|---|---|---|---|---|---|---|---|---|---|---|---|---|---|---|---|---|
| 07/16/03 | 0 | 08 | 1.00 | 84 | 5 | 0.620 | 234.0 | 0.620 | 01 | 0.0 | 1.000 | 3828000 | 01 | 0.0 | 1.000 | 317.4 | 00 | 01 | 11.0 | 00 | 00 | 60 | 1800 |
| 07/16/03 | 1 | 08 | 1.00 | 80 | 5 | 0.640 | 225.0 | 0.640 | 01 | 0.0 | 1.000 | 3756000 | 01 | 0.0 | 1.000 | 321.8 | 00 | 01 | 10.8 | 00 | 00 | 60 | 1800 |
| 07/16/03 | 2 | 08 | 1.00 | 79 | 5 | 0.687 | 228.0 | 0.687 | 01 | 0.0 | 1.000 | 3864000 | 01 | 0.0 | 1.000 | 338.9 | 00 | 01 | 10.6 | 00 | 00 | 60 | 1800 |
| 07/16/03 | 3 | 08 | 1.00 | 83 | 5 | 0.693 | 234.0 | 0.693 | 01 | 0.0 | 1.000 | 3966000 | 01 | 0.0 | 1.000 | 341.9 | 00 | 01 | 10.6 | 00 | 00 | 60 | 1800 |
| 07/16/03 | 4 | 08 | 1.00 | 84 | 5 | 0.671 | 238.0 | 0.671 | 01 | 0.0 | 1.000 | 3960000 | 01 | 0.0 | 1.000 | 337.3 | 00 | 01 | 10.8 | 00 | 00 | 60 | 1800 |
| 07/16/03 | 5 | 08 | 1.00 | 81 | 5 | 0.722 | 231.0 | 0.722 | 01 | 0.0 | 1.000 | 3960000 | 01 | 0.0 | 1.000 | 352.9 | 00 | 01 | 10.5 | 00 | 00 | 60 | 1800 |
| 07/16/03 | 6 | 08 | 1.00 | 98 | 6 | 0.989 | 278.0 | 0.989 | 01 | 0.0 | 1.000 | 4962000 | 01 | 0.0 | 1.000 | 464.6 | 00 | 01 | 10.1 | 00 | 00 | 60 | 1800 |
| 07/16/03 | 7 | 08 | 1.00 | 79 | 5 | 0.767 | 214.0 | 0.767 | 01 | 0.0 | 1.000 | 3852000 | 01 | 0.0 | 1.000 | 357.1 | 00 | 01 | 10.0 | 00 | 00 | 60 | 1800 |
| 07/16/03 | 8 | 08 | 1.00 | 78 | 5 | 0.656 | 219.0 | 0.656 | 01 | 0.0 | 1.000 | 3798000 | 01 | 0.0 | 1.000 | 317.4 | 00 | 01 | 10.4 | 00 | 00 | 60 | 1800 |
| 07/16/03 | 9 | 08 | 1.00 | 80 | 5 | 0.622 | 220.0 | 0.622 | 01 | 0.0 | 1.000 | 4116000 | 01 | 0.0 | 1.000 | 277.9 | 00 | 01 | 9.6 | 00 | 00 | 60 | 1800 |
| 07/16/03 | 10 | 08 | 1.00 | 79 | 5 | 0.595 | 223.0 | 0.595 | 01 | 0.0 | 1.000 | 4050000 | 01 | 0.0 | 1.000 | 274.3 | 00 | 01 | 9.9 | 00 | 00 | 60 | 1800 |
| 07/16/03 | 11 | 08 | 1.00 | 80 | 5 | 0.577 | 230.0 | 0.577 | 01 | 0.0 | 1.000 | 4020000 | 01 | 0.0 | 1.000 | 276.5 | 00 | 01 | 10.3 | 00 | 00 | 60 | 1800 |
| 07/16/03 | 12 | 08 | 1.00 | 80 | 5 | 0.589 | 232.0 | 0.589 | 01 | 0.0 | 1.000 | 4050000 | 01 | 0.0 | 1.000 | 282.4 | 00 | 01 | 10.3 | 00 | 00 | 60 | 1800 |
| 07/16/03 | 13 | 08 | 1.00 | 80 | 5 | 0.586 | 235.0 | 0.586 | 01 | 0.0 | 1.000 | 4080000 | 01 | 0.0 | 1.000 | 283.4 | 00 | 01 | 10.4 | 00 | 00 | 60 | 1800 |
| 07/16/03 | 14 | 08 | 1.00 | 79 | 5 | 0.594 | 234.0 | 0.594 | 01 | 0.0 | 1.000 | 4098000 | 01 | 0.0 | 1.000 | 284.8 | 00 | 01 | 10.3 | 00 | 00 | 60 | 1800 |
| 07/16/03 | 15 | 08 | 1.00 | 81 | 5 | 0.588 | 240.0 | 0.588 | 01 | 0.0 | 1.000 | 4194000 | 01 | 0.0 | 1.000 | 281.9 | 00 | 01 | 10.3 | 00 | 00 | 60 | 1800 |
| 07/16/03 | 16 | 08 | 1.00 | 81 | 5 | 0.581 | 253.0 | 0.581 | 01 | 0.0 | 1.000 | 4470000 | 01 | 0.0 | 1.000 | 275.7 | 00 | 01 | 10.2 | 00 | 00 | 60 | 1800 |
| 07/16/03 | 17 | 08 | 1.00 | 80 | 5 | 0.598 | 227.0 | 0.598 | 01 | 0.0 | 1.000 | 4050000 | 01 | 0.0 | 1.000 | 281.1 | 00 | 01 | 10.1 | 00 | 00 | 60 | 1800 |
| 07/16/03 | 18 | 08 | 1.00 | 80 | 5 | 0.594 | 230.0 | 0.594 | 01 | 0.0 | 1.000 | 4056000 | 01 | 0.0 | 1.000 | 282.1 | 00 | 01 | 10.2 | 00 | 00 | 60 | 1800 |
| 07/16/03 | 19 | 08 | 1.00 | 82 | 5 | 0.579 | 235.0 | 0.579 | 01 | 0.0 | 1.000 | 4062000 | 01 | 0.0 | 1.000 | 280.4 | 00 | 01 | 10.4 | 00 | 00 | 50 | 1800 |
| 07/16/03 | 20 | 08 | 1.00 | 81 | 5 | 0.588 | 233.0 | 0.588 | 01 | 0.0 | 1.000 | 4068000 | 01 | 0.0 | 1.000 | 282.0 | 00 | 01 | 10.3 | 00 | 00 | 60 | 1800 |
| 07/16/03 | 21 | 08 | 1.00 | 81 | 5 | 0.596 | 233.0 | 0.596 | 01 | 0.0 | 1.000 | 4068000 | 01 | 0.0 | 1.000 | 285.8 | 00 | 01 | 10.3 | 00 | 00 | 60 | 1800 |
| 07/16/03 | 22 | 08 | 1.00 | 80 | 5 | 0.604 | 232.0 | 0.604 | 01 | 0.0 | 1.000 | 4062000 | 01 | 0.0 | 1.000 | 289.6 | 00 | 01 | 10.3 | 00 | 00 | 60 | 1800 |
| 07/16/03 | 23 | 08 | 1.00 | 79 | 5 | 0.589 | 225.0 | 0.589 | 01 | 0.0 | 1.000 | 4014000 | 01 | 0.0 | 1.000 | 276.7 | 00 | 01 | 10.1 | 00 | 00 | 60 | 1800 |
| 07/17/03 | 0 | 08 | 1.00 | 80 | 5 | 0.580 | 227.0 | 0.580 | 01 | 0.0 | 1.000 | 3960000 | 01 | 0.0 | 1.000 | 277.9 | 00 | 01 | 10.3 | 00 | 00 | 60 | 1800 |
| 07/17/03 | 1 | 08 | 1.00 | 80 | 5 | 0.583 | 230.0 | 0.583 | 01 | 0.0 | 1.000 | 3978000 | 01 | 0.0 | 1.000 | 282.0 | 00 | 01 | 10.4 | 00 | 00 | 60 | 1800 |
| 07/17/03 | 2 | 08 | 1.00 | 79 | 5 | 0.592 | 227.0 | 0.592 | 01 | 0.0 | 1.000 | 3972000 | 01 | 0.0 | 1.000 | 283.5 | 00 | 01 | 10.3 | 00 | 00 | 60 | 1800 |
| 07/17/03 | 3 | 08 | 1.00 | 88 | 5 | 0.577 | 251.0 | 0.577 | 01 | 0.0 | 1.000 | 4260000 | 01 | 0.0 | 1.000 | 284.6 | 00 | 01 | 10.6 | 00 | 00 | 60 | 1800 |
| 07/17/03 | 4 | 08 | 1.00 | 89 | 5 | 0.577 | 255.0 | 0.577 | 01 | 0.0 | 1.000 | 4290000 | 01 | 0.0 | 1.000 | 287.5 | 00 | 01 | 10.7 | 00 | 00 | 60 | 1800 |
| 07/17/03 | 5 | 08 | 1.00 | 82 | 5 | 0.607 | 235.0 | 0.607 | 01 | 0.0 | 1.000 | 4068000 | 01 | 0.0 | 1.000 | 293.6 | 00 | 01 | 10.4 | 00 | 00 | 60 | 1800 |
| 07/17/03 | 6 | 08 | 1.00 | 80 | 5 | 0.603 | 238.0 | 0.603 | 01 | 0.0 | 1.000 | 4038000 | 01 | 0.0 | 1.000 | 297.2 | 00 | 01 | 10.6 | 00 | 00 | 60 | 1800 |
| 07/17/03 | 7 | 08 | 1.00 | 80 | 5 | 0.613 | 252.0 | 0.613 | 01 | 0.0 | 1.000 | 4368000 | 01 | 0.0 | 1.000 | 296.5 | 00 | 01 | 10.4 | 00 | 00 | 60 | 1800 |

PC - Process Codes:
01 - Changing Fuels
02 - Control Equipment Malfunction
03 - Startup
04 - Shutdown
05 - Process Down
06 - Clean Process Equipment
07 - Clean Control Equipment
08 - Normal Operation
09 - Other

MC - Monitoring Codes:
00 - Data Valid
10 - Required Adjustment Not Made
11 - Excess Drift Primary Analyzer
12 - Excess Drift Ancillary Analyzer
13 - Process Down
14 - Recalibration
15 - Preventive Maintenance
16 - Primary Analyzer Malfunction
17 - Ancillary Analyzer Malfunction
18 - Data Handling System Malfunction
19 - Sample Interface Malfunction
20 - Corrective Maintenance
21 - Blowback
22 - Analyzer Under/Over Range
98 - Automatic Calibration
99 - Software Adjust

P75 - Method Codes:
01 - Primary Monitoring System Greater than 01 indicates the Data Substitution Method used

FIG 8

Table I.

| Test | Burner | Tons of Coal Treated | Treatment Location | Application Rate | Benefuel Product |
|---|---|---|---|---|---|
| July 2003 | Standard | 136 | Utility plant coal yard | 0.8 wt% | 67% |
| November 2003 | Low-NOx | 400 | Norton, VA | 0.9 wt% | 53% |

FIG 11

Table II

| Data Set | Average Steam Generated k lb/hr | Average NOx lbs/MBTU | Average Heat Input MBTU/hr | Stack Flow SCFH | NOx ppm | % CO2 | Average Coal Consumption Tons/hr |
|---|---|---|---|---|---|---|---|
| Control | 82.0 | 0.662 | 232 | 3874800 | 332 | 10.8% | 9.7 |
| Benefuel | 80.2 | 0.590 | 233 | 4091857 | 279 | 10.2% | 9.7 |
| | | | | | | | |
| Change % | -2.20% | -10.95% | 0.43% | 5.60% | -15.96% | -5.56% | 0.00% |

FIG 12

Table III

| Data Set | Average Steam Generated k lb/hr | Average NOx lbs/MBTU | Average Heat Input MBTU/hr | Stack Flow SCFH | NOx ppm | % CO2 | Average Coal Consumption Tons/hr |
|---|---|---|---|---|---|---|---|
| Untreated | 110.4 | 0.426 | 160.74 | 2739600 | 209.4 | 10.6 | 6.5 |
| Treated | 117 | 0.377 | 169.75 | 2686500 | 199.5 | 11.4 | 6.9 |
|  |  |  |  |  |  |  |  |
|  | 5.6% | -12.9% | 5.3% | -2.0% | -5.0% | 7.2% | 5.3% |

CHEMICAL CHANGE AGENT

This application is a Continuation-In-Part of Ser. No. 10/086,902, filed Mar. 1, 2002, under the title, "Synfuel Composition and Method of Using Same" by the same inventor, Joseph W. Hundley, now U.S. Pat. No. 6,860,911. The earlier filed application, Ser. No. 10/086,902, is a continuation in part of Ser. No. 09/757,765, filed Jan. 10, 2001 and has the same sole inventor, now U.S. Pat. No. 6,740,133. This application also incorporates by reference and relies on the filing dates and content of two provisional applications, Ser. No. 60/451,590, filed Mar. 3, 2003, entitled "Synfuel", by the same inventor as herein, and Ser. No. 60/490,995, filed Jul. 29, 2003, entitled "Clean Fuel Agent and Method of Applying Same" by the same inventor as herein.

BACKGROUND OF THE INVENTION

The present invention relates to a liquid synfuel additive composition for application to materials such as coal for facilitating more complete and efficient combustion thereof.

This invention centers around a substance to convert raw coal fines into a synthetic fuel product. This substance, classified as a chemical change agent, contains functional groups, which are chemically active, and combine with coal to bring about a compositional change.

The invention encompasses the application of certain chemicals and compounds which can be used a bonafide chemical change reagent. These create a significant amount of chemical change when applied to the exterior of the coal to become a synfuel product. Furthermore, the enhancement of the basic chemical change reagent with ammonia like compounds, the chemical change agent will reduce NOx emissions in the exhausts gases created upon burning of said coal. The various formulations, including but not limited to those claimed below, can be utilized specifically for the purpose of being a sprayed on Nox reducing agent before the burner or combustion and ideally before the grinding of the coal. Grinding distributes the NOx reducers evenly. The use of a wetting agent promotes the absorption of the chemical change agent and NOx reducers into the coal thus improving chemical change and even distribution of NOx reducers. Titanium Dioxide can be added to the composition to promote NOx reduction since Titanium Dioxide acts as a catalyst for NOx reduction.

Ammonia like compounds consist essentially of amides, amines, amino acids and other chemical compounds containing at least one functional NH, NH2 or NH3 group. Ammonia like compounds act as NOx reducers when burned with coal. Hydrocarbon wax is used in some versions to keep the NOx reducing agents from leaching out. This is important since coal may be rained on during the transportation or in stockpiles. Hydrocarbon Wax may be selected from the group consisting of paraffin wax, slack wax, microcrystalline wax, olefinic wax, fatty acid and mixtures thereof. The product can be used as a chemical change agent, NOx reducing agent or both a chemical change agent and a NOx reducing agent.

This invention also is directed to the combination chemical change agent and NOx reducer acting to also reduce Sulfur Dioxide (SOx).

EXAMPLES OF USE

In addition, this invention seeks to show the applicability of urea to chemical change agents as well as ammonia additives. It illustrates applicability of urea to the fuel itself and not to the flue gases which has been an approach used by industry.

The invention also seeks to show that other additives besides titanium dioxide can be used as a chemical change agent and/or as a NOX reduction agent without being a chemical change agent. The invention shows a low NOX formulation which includes urea. It also shows different ways to use titanium dioxide and urea as each works at different temperature ranges to effect NOX reduction and could be said to complement each other.

PRIOR ART

There is no existing prior art so far as the inventor hereof is aware. There have been fatty acids used in making wax emulsions for the purpose of sealing them against liquid water. There may have been some experimentation with using urea in flue gases to reduce NOX and SOX but applicant is not aware of any prior art.

Although polyvinyl alcohol is known both as a film-forming agent and an emulsifier, it does not meet ASTM standard C 309-95 when tested as a liquid membrane-forming compound for curing concrete. The reason for this is that although polyvinyl alcohol typically exhibits a low permeability to gases, it does not exhibit a low permeability to either ammonia or water vapor. As a result, polyvinyl alcohol is insufficient to prevent significant loss of water from concrete during curing.

Paraffinic compounds are known to be water repellant and thus paraffin is typically used as a compound of wood preservative agents. For Example, U.S. Pat. No. 4,389,446 discloses a composition useful as a wood preservative agent which includes an organic solvent, solid paraffin as a water repellant agent and a biocide.

There is a great need for additives to combustibles these days which tend to act as chemical change agents to facilitate more complete combustion. Accordingly, there is an ongoing need for such chemical change agents to facilitate more complete combustion of coal. This invention shows the application of certain chemicals and compounds, which in the instant formulations, can be used as bona-fide chemical change agents for purposes of creating significant chemical change when applied to the exterior of the combustible product prior to burning via a spray application to the exterior of the product. When enhanced with ammonia-like compounds this invention will reduce NOX emissions. The disclosure herein shows various formulations which can be utilized specifically for the purpose of being sprayed on as a NOX reducing agent. The product can be used as a NOX reducing agent or a chemical change agent or both.

It is an object of this invention to provide a chemical change agent to facilitate the complete combustion of coal, and It is another object of this invention to provide a synfuel additive which is environmentally acceptable and inexpensive, and It is still another object of this invention to provide a product which can be used as a NOX reduction agent as well as a chemical change agent, or both, and It is yet another object of this invention to provide a product which can be applied to a combustible via a spray application process prior to the introduction of the combustible into a boiler so that known NOX reducing compounds can be introduced into the combustion process without requiring boiler modifications, and It is a further object of this invention to provide a produce which is introduced to a fuel such as coal prior to combustion and preferably by grinding it up with the coal before the coal enters the combustion chamber so as to be dispersed evenly throughout the coal to facilitate complete combustion and a reduction in NOx, and It is yet another object of this invention to provide a novel synfuel which meets the definition of "synfuel" in Section 29 of the Internal Revenue Code which defines it so that users may obtain tax reductions.

These and other objects of this invention will become more apparent when reference is had to the accompanying specification.

SUMMARY OF THE INVENTION

The present invention relates to an aqueous composition to be used as a synfuel additive for combustible materials, especially coal.

One of the products contemplated by this invention is a latex emulsion comprising a paraffin wax or wax, a polyvinyl alcohol and water. The percentage of each ingredient is as follows:

| | |
|---|---|
| Paraffin wax or wax | 22.5% |
| Polyvinyl alcohol | 3.5% |
| Water | 74.0% |

Other additives can be used to improve properties including varying percentages of polyvinyl acetate. A blend of 90% of the latex emulsion, specified above, with 10% polyvinyl acetate produced good burning results. Likewise, the latex emulsion by itself proved to be a satisfactory synfuel additive. The use of the polyvinyl alcohol, makes the emulsion.

The use of the polyvinyl agent produces a chemical change agent which turns the composition into a synfuel. The invention contemplates adding polyvinyl acetate to the composition to enhance it's combustibility. It is contemplated that 10% or more may be added to the composition. The range can be from 0 to 20%.

It is also contemplated to add a pigment composition to make the chemical change agent black so as to blend with the coal. The use of carbon black may interfere with the strength of the film. The use of $TiO_2$ or $CaCO_2$ adds strength to the film. The use of these white pigments makes it easy to identify the coal that has been treated. There is an added benefit to add calcium-containing material like Calcium Oxide or Calcium Carbonate, as these compounds, when burned with the fuel, will react with Sulfur Dioxide to form Calcium Sulfate.

The exact percentages of the ingredients apparently can vary as follows:

| | |
|---|---|
| Paraffin wax or other wax | 0% to 55% |
| Polyvinyl alcohol | 0% to 50% |

Further testing is required to determine if the polyvinyl alcohol will work by itself. The Paraffin wax will not qualify as a synthetic material unless it is a synthetic wax.

The combination of polyvinyl alcohol and wax is synthetic since the polyvinyl alcohol is synthetic and is required to emulsify the wax.

The best product will have a solids content of from 25% to 50% with a 2% to 10% of the solids coming from polyvinyl alcohol and the remainder coming from the wax. The polyvinyl acetate may be added as needed.

The action of the moisture barrier and vapor barrier aspects of the composition are thought to be important to the action of the synfuel.

Additionally, another treatment of a combustible can be effected by the use of a product which can act either as a chemical change agent or a NOX reducer, or both. The treatment contemplates spraying the product onto the combustible prior to its combustion so as to eliminate the need for any medications to the combustion chamber and equipment. This product is added to the fuel prior to combustion and preferably dispersed evenly with it so as to facilitate complete combustion.

DETAILED DESCRIPTION OF THE PREFERRED EMBODIMENTS

The compositions of the invention generally comprise at least one hydrocarbon was dispersed in an aqueous emulsion, which can form a film on particles of coal. The emulsions used in the composition of the present invention are preferably made using polyvinyl alcohol as the emulsifying agent. Thus, in it broadest form, the present invention relates to an aqueous composition comprising a hydrocarbon wax, a polyvinyl alcohol emulsifying agent, and the balance of water.

The aqueous composition of the present invention is designed for use as a coating for application to materials when burned. The purpose of using the film of the present invention is aide the combustion of the material to which it is applied.

Typical materials to which the composition of the present invention may be applied include materials such as coal, both bituminous and sub bituminous as well as lignite, wood and rubber.

The aqueous film composition of the present invention may be applied to a number of different materials. Both whole coal as well as coal "tailings" or fines can be coated with the instant film to facilitate combustion of the resulting material as a synfuel.

Representative non-limiting examples of the hydrocarbon waxes of the present invention include paraffin wax, slack wax, microcrystalline wax, olefin waxes and other, conventional, know hydrocarbon waxes. More preferred hydrocarbon waxes are those made up of relatively high molecular weight components since such waxes tend to exhibit better film-forming properties. Included in the hydrocarbon waxes are fatty acids like Oleic, Steaeric, Linoleic, Linolenic, Palmitic, Myristic, Lauric, Capric and other fatty acids.

The aqueous composition of the present invention comprises 5.0% to 45.0% by weight, based on the total weight of the composition, of the hydrocarbon wax. More preferably, the aqueous composition of the present invention comprises 10% to 35% by weight of the hydrocarbon wax and, as a preferred ratio, the aqueous coating composition of the invention comprises 15 to 25% by weight of the hydrocarbon wax. Naturally, the mixtures of one or more hydrocarbon waxes may also be employed in the aqueous composition.

In addition to water and the hydrocarbon wax, the aqueous coating composition of the present invention comprises an emulsifying agent such that the aqueous composition forms an emulsion in water, which can be applied to a coal material. The emulsifying agents useful in the present invention are the polyvinyl alcohols. Any form of polyvinyl alcohol may be employed in the present invention irrespective of its degree of hydrolysis and/or degree of polymerization. However, the degree of polymerization and degree of hydrolysis of the polyvinyl alcohol may have an impact on the strength of the film, which is formed from the aqueous coating composition of the present invention. The specific polyvinyl alcohol which is selected to be used in the present invention will be that which demonstrates the best properties in terms of combustion.

The polyvinyl alcohol emulsifying agent is employed in an amount of 1.0% to 10.0% by weight, based on the total weight of the aqueous coating composition. More preferably, the polyvinyl emulsifier comprises 2 to 5% by weight of the composition Naturally, mixtures of two or more polyvinyl alcohols having differing degrees of hydrolysis and/or polymerization may be employed in the aqueous synfuel composition of the present invention.

The composition of the present invention may also optionally include up to 1.0% by weight of a biocide, based on the total weight of the composition. Such biocides are known in the art and include pesticides and other materials designed to prevent the growth of organisms in the aqueous coating composition during storage and use. The biocide will typically be employed in an amount sufficient to prevent the growth of living organisms in the aqueous coating composition during storage. Such amounts do not usually exceed 1.0% by weight and, more preferably, only up to 0.5% by weight of the biocide is employed. Most preferably, the biocide comprises up to 0.105 by weight of the aqueous synfuel composition.

In addition, the synfuel composition of the invention may optionally contain one or more filler materials. Any conventional filler material may be used for this purpose such as oxygen containing compounds like sugar, acetic acid and salts of acetic acid and other oxygen containing compounds may be added to improve combustion. Calcium Oxide, Calcium Carbonate and Lime may be added to the emulsion in order to add solids as well as to reduce Sulfur Dioxide emissions. Calcium compounds may be 0% to 61% of the formula.

The synfuel composition of the invention may be made by mixing the ingredients using a conventional mixing apparatus. If a prolonged storage period is anticipated, it is preferred to run the composition through a homogenizer before putting it in a storage container. The composition is storage stable for prolonged periods of six months or more. The addition of a biocide prevents the growth of undesirable organisms.

The synfuels composition of the present invention can be applied in any conventional manner. For example, the composition my be applied using spray guns immersion, etc.

The instant invention also meets all the Federal Air Quality Regulations in 40 C. F. R. This is very significant since conventional, commercially available synfuels, do not, in a lot of cases, meet the Federal Standards, as they contain hazardous components and/or volatile organic compounds. Hence, the instant invention is environmentally friendly. The addition of polyvinyl acetate to the basic composition enhances it burning ability when used with coal.

In addition to being non-toxic and containing no volatile organic compounds, the present invention does not leave any residue necessitating clean up after combustion. In fact, it facilitates a more complete combustion of the coal and hardly leaves any residue. The addition of Calcium compounds also will reduce Sulfur Dioxide emissions.

FIGS. 7a, 7b and 8 show tables with hourly data summeries for the chemical change agent and NOx reducer of the invention.

FIG. 11 shows a table summerizing the test conditions.

FIG. 12 shows a table summerizing the performance of the product during the Jul. 2003 test.

TESTS ON THE NEW SYNFUEL ADDITIVE KNOWN AS SYNTEX WITH HIGH VOLATILE COAL FINES

Figure 1:
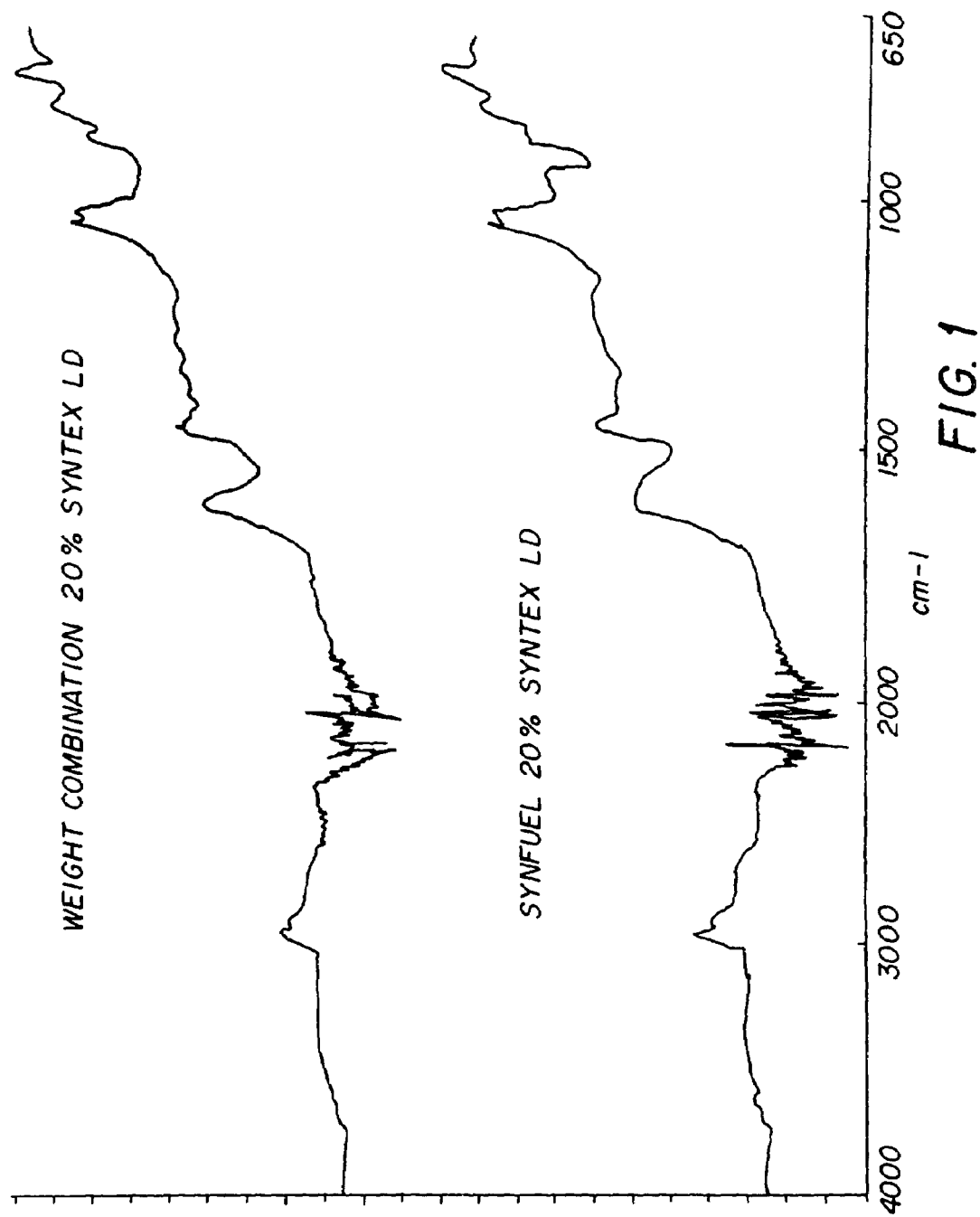
FIG. 1 is a graph of the chemical changes in weight combination contrasted with the synfuel 0.20% Syntex LD.

Basically the new substance which forms the core of this invention converts raw coal fines into a synthetic fuel product. The substance, classified as a chemical change agent, contains functional groups, which are chemically active, and combine with coal to bring about a compositional change. The object of the tests was to determine whether or not the chemical change agent provided would bring about sufficient chemical reactions when combined with the feedstock coal fines to produce a synthetic fuel product.

Raw coal fines are combined with the chemical change agent. The two substances were then mixed to insure maximum contact to allow a chemical reaction to occur. The mixture was then compressed to form the synthetic fuel product. These distinctive conditions were simulated during the test to effectively recreate those found within a synthetic fuel plant.

The chemical combinations of the mixture can produce a synthetic fuel source with a decidedly different chemical composition than that of a physical mixture of the coal and agent. The industry standard is a minimum of 15% chemical change.

The two mixture ingredients were separately analyzed as was the mixture product using Fourier Transform Infrared spectroscopy in order to confirm or disprove an actual chemical change within the synthetic fuel product.

Fourier Transform Infrared spectroscopy allows one to observe the chemical structures of materials. In this case, the analysis was used to search for a difference in spectra among the samples tested. Differences in the spectra of the material indicates a chemical change among the materials. These spectral changes can range from differences in intensity at equivalent frequencies to different peak structures at equivalent frequencies.

The analysis spectra displayed an obvious and measurable chemical change between the synthetic fuel product and the raw coal fines. These measurable spectra differences indicate that the synthetic fuel is a product of intricate chemical changes and not just a physical combination of coal and the chemical change agent.

Two chemical change agents were used in the test. The first was Syntex-LD and the second was Syntex-MD. The raw coal sample was meticulously mixed and riffed to garner a smaller sample for analysis. The raw coal was reduced in particle size using a mortar and pestle through a sixty mesh screen. The grinding process was performed at a minimal pace and care was taken to clean all instruments in order to avoid a cross-contamination of samples. The same process was used on the synthetic fuel mixture.

During the test, the raw coal, chemical change agent and synthetic fuel spectra were obtained with a Perkin Elmer Spectrum One FTIR spectrometer. Thirty-two scans of each sample comprised an average to obtain final spectra listed below.

Fourier Transform Infrared Spectroscopy is useful for determining chemical bonds within substances. Alterations in the spectra of raw coal and the synthetic fuel indicate a change in the chemical bonds at these wavelengths. Thus, a greater or lesser number of certain bonds at a wavelength will lead to a change in the spectra involved The bonds most often seen pertaining to raw coal and the synthetic fuel product are:

1. Carbon-carbon bonds. Basic organic molecules are constructed of carbon-carbon bonds. These bonds may be either aromatic or aliphatic. Aromatic carbon atoms are joined in a ring structure and involve double bonds among the carbon bonds. The infrared area of interest for these bonds is around 1500-1650 wave numbers. It should be noted that most of the bond stretching occurs in the range of 1600-1650 wave numbers.

Any change in intensity of two spectra or peak structure in this area would indicate a definite chemical difference between two substances. Thus, if the synthetic fuel product displays a greater or lesser intensity in this range than the raw coal a chemical change has occurred. Peak structure differences in this range would indicate a chemical change.

2. Carbon-Oxygen bonds. These adsorb infrared light from 1050-1250 wave numbers. The actual range of adsorption will vary depending upon whether or not it is attached to an aliphatic or aromatic carbon base.

Any change in intensity of two spectra or peak spectra in this area would Indicate a chemical difference between two substances.

3. Carbon-Hydrogen bonds. These bonds are prominent in aliphatic carbon structures with peak adsorption of infrared light at around 1360 and 1430-1470 wave numbers. In aromatic carbons the carbon-hydrogen bonds adsorb infrared light from about 650-925 wave numbers.

Fourier Transform Infrared Spectroscopy Results

Figure 2:
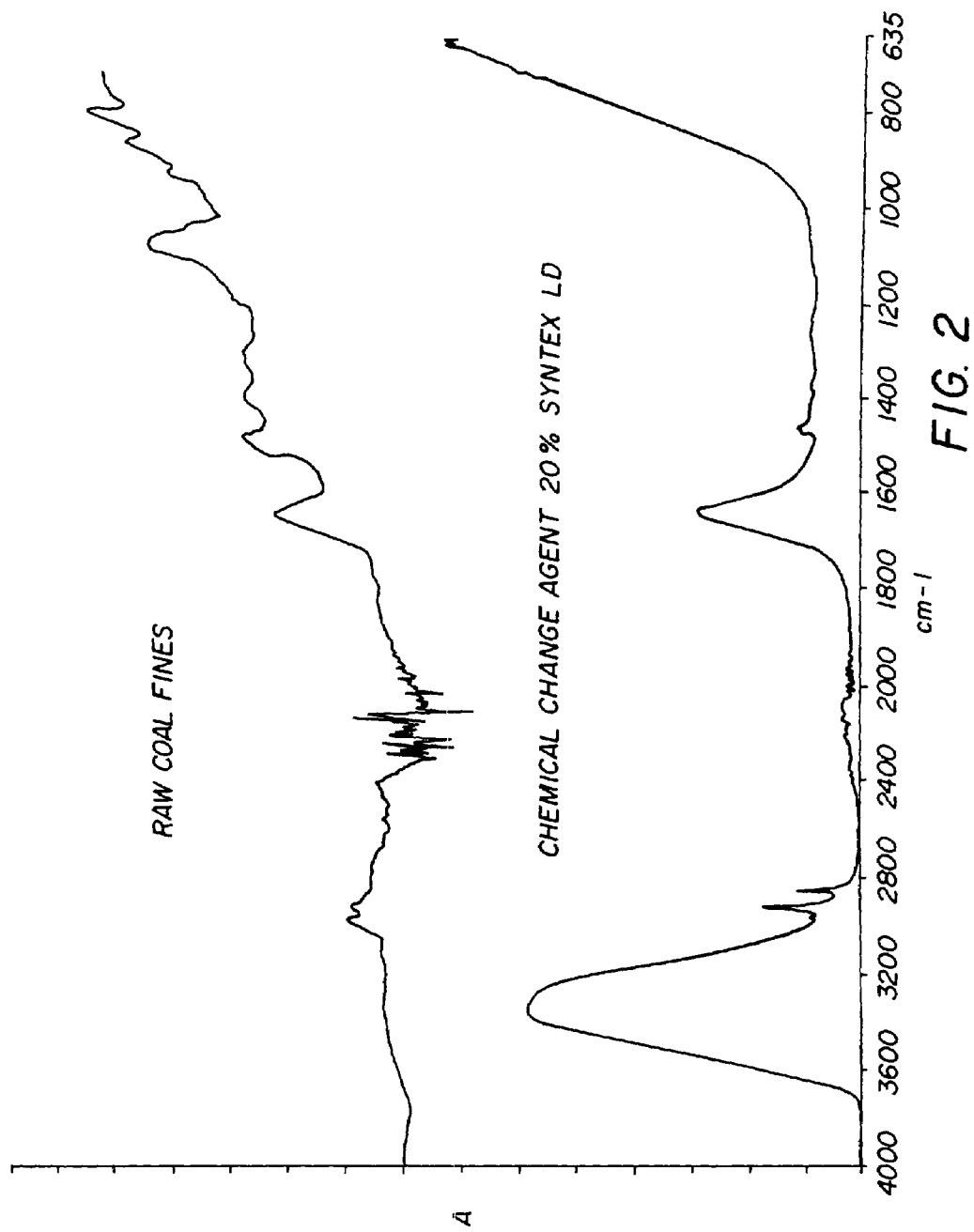
FIG. 2 is a graph of the chemical changes in weight of the raw coal fines and the chemical change agent 0.20% Syntex LD.

There are comparisons of raw coal fines, synthetic fuel product and the chemical change agent on the graphs shown as FIGS. 1 and 2. The synthetic fuel contained 0.20% wt. of the agent and 99.80% of raw coal. In order to construct a weight combination spectra the agent spectra was multiplied by 0.0020 and the raw coal spectra was multiplied by 0.9980. These two spectra were then added together to form the Weight Combination spectra. This addition accounts for the percentage of agent and raw coal within the sample itself.

Thus, a difference in the weight combination spectra and the spectra of the synthetic fuel product would indicate a difference in chemical bonds associated with each spectra. Therefore, a change in the weight combination spectra as compared to the synthetic fuel spectra would serve as evidence that an actual chemical change has occurred in the formation of the synthetic fuel.

In this particular analyzation, the synthetic fuel spectra is significantly and measurable different from the spectra of the weight combination spectra using the prescribed agent. The calculated mathematical difference between the weight combination spectra and that of the synfuel spectra totaled a net 23% change. This difference confirms the claim the the synthetic fuel product is the production of chemical changes and not merely a physical mixture.

FIGS. 1 and 2 show the differences between the raw coal, the agent and the two mixtures, Syntex-LD and Syntex-MD. The LD and MD stand for low density and medium density, terms used to describe coal.

The results showed spectral changes and include.

1. An increase in absorbance of the doublet peak at around 1050 wave numbers. This area is associated with carbon-oxygen bonds. The increase of the synthetic fuel's absorbance in this area indicates a differing type of bonding than that of a physical mixture.
2. An increase in absorbance at 1600 wave numbers which is associated with aromatic carbon-carbon bonds. This indicates that the synthetic product has more aromatic carbon-carbon bonds than a physical mixture would have.
3. An increase in absorbance at 2900 wave numbers. This is an area of absorbance associated with carbon-hydrogen bonds. The synthetic fuel product displays a larger number of these bonds than those that would be found in a physical mixture.
4. An increase in absorbance at 1440 wave numbers. This is an area of absorbance associated with carbon-hydrogen bonds as well. The synthetic fuel product displays a larger number of these bonds than those that would be found in a physical mixture.

In conclusion the analysis proved the chemical changes occur when the chemical change agent of this invention, either Syntex-LD or Syntex-MD is combined with raw coal fines to create a synthetic fuel product.

Tests on the Chemical Change Agent Known as Syntex with Low Volatile Coal Fines

Figure 3:
FIG. 3 is a graph of the chemical change in weight of the feedstock coal fines and the chemical change agent 0.20% Syntex LD.
Figure 4:
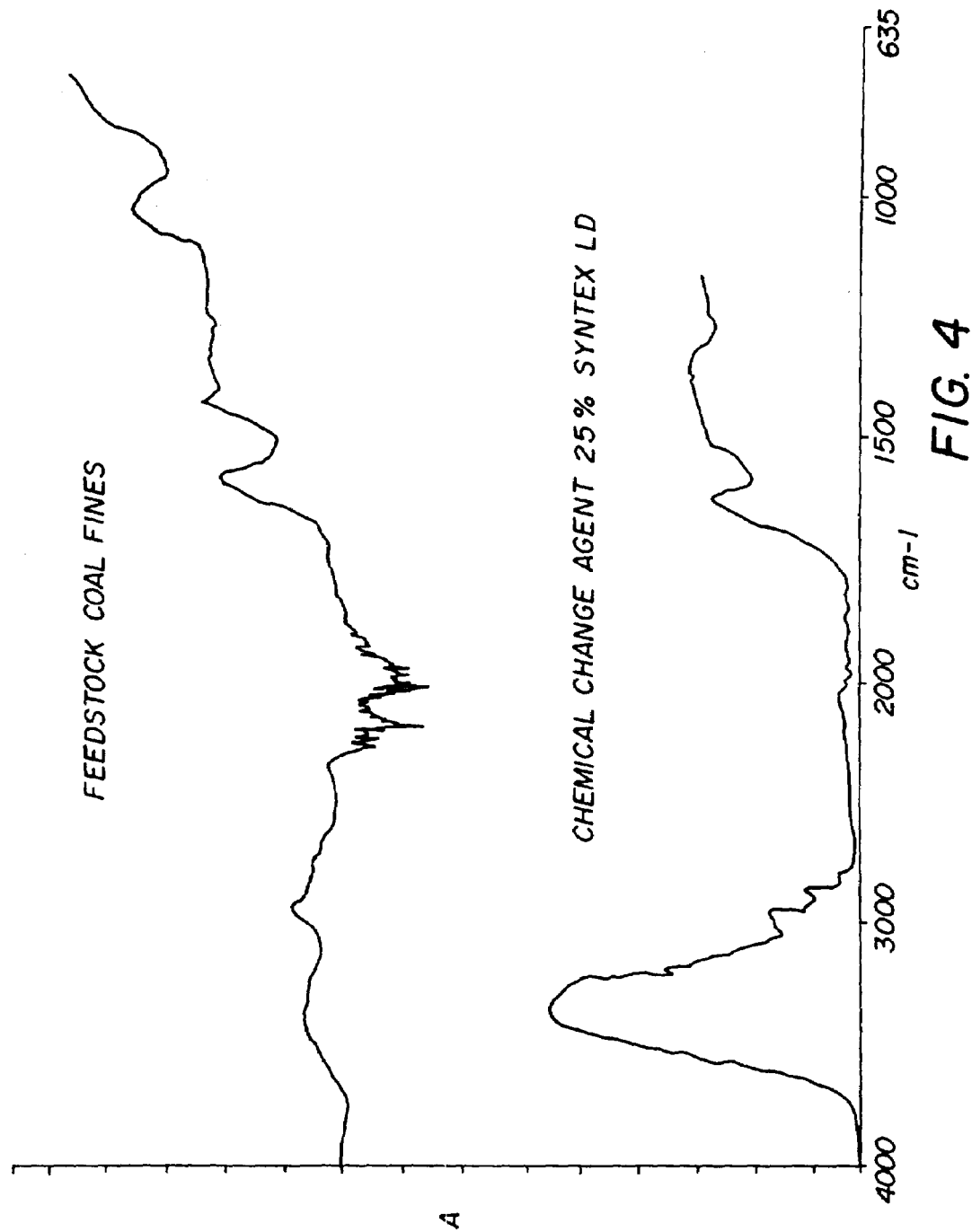
FIG. 4 is a graph of the chemical change in weight of the synfuel 0.25% Syntex LD and the weight combination 0.25% Syntex LD.

The same tests were run and the results of the Fourier Transform Infrared Spectroscopy are as follows:

There are comparisons of the raw coal fines, synthetic fuel product and the agent on the graphs shown as FIGS. 3 and 4. The synthetic fuel contained a 0.25% wt of agent and 99.75% wt of raw coal. In order to contstruct a weight combination spectra the agent spectra was multiplied by 0.0025 and the raw coal spectra was multiplied by 0.9975. These two spectra were then added together to form the Weight Combination spectra. This addition accounts for the percentage of agent and raw coal within the sample itself.

Thus, a difference in the weight combination spectra and spectra associated with the synthetic fuel product would indicate a difference in chemical bonds associated with each spectra. In this analyzation, the synthetic fuel spectra is significantly and measurable different from the spectra of the weight combination spectra using the prescribed agent. The calculated mathematical difference between the weight combination spectra and that of the synfuel spectra total a net 19% change. This difference confirms the claim that the synthetic fuel product is the production of chemical changes and not a mere physical mixture.

The spectral changes that point to the chemical reactions and change include:

1. An increase in absorbance of the doublet peak at around 1050 wave numbers. This area is associated with carbon-oxygen bonds.
2. An increase in absorbance at 1600 wave numbers. This area is associated with aromatic carbon-carbon bonds.
3. An increase in absorbance at 2900 wave numbers which is associated with carbon-hydrogen bonds. The number of bonds is larger than in a mere mixture.

4. An increase in absorbance at 1440 wave numbers which is associated with carbon-hydrogen bonds as well.

The conclusion is that again with low density coal, several chemical changes occurred when the agent was combined with the coal. The mixture is another entity entirely when compared with the raw coal and agent in physical combination.

The samples are as follows:

| Syntex LD | 0.20% | 21% |
|---|---|---|
| Syntex LD | 0.20% | 27% |
| Syntex LD | 0.20% | 15% |
| Syntex LD | 0.20% | 13% |

The most successful formula contains paraffin wax, paraffin oil, hydrocarbon wax in the form of stearic acid, titanium dioxide, water and aqua ammonia. The fatty acid reacted with ammonia also acts as an emulsifying agent. The reaction is as follows ammonium stearate is used in this example but other fatty acids and bases may be used.

Stearic Acid+Ammonium Hydroxide - - - Ammonium Stearate+Water.

$C_{17}H_{35}COOH+NH_4OH$ - - - $C_{17}H_{35}COONH_4+H_2O$

Ammonium Stearate+Calcium Hydroxide (from coal) - - -

$2(C_{17}H_{35}COONH_4+CaOH$ - - -

Calcium Stearate+Ammonium Hydroxide $Ca(C_{18}H_{35}O_2)_2+2NH_4OH$

This reaction results in changing the coal in a number of measurable ways:

1. First, it shifts the Thermo-gravimetric analysis (TGA) to the right. The TGA test measures the temperature and rate at which pyrolysis products evolve. A change in TGA of 7% or more indicates significant chemical change has occurred. Tests in a laboratory report a 28% change in peak area on a TGA test. Further tests also report a high TGA with 14.6% change in peak area. This is an extremely high chemical change agent that they have tested at 0.2% application rate.
2. Second, ammonia released from this reaction reacts with aldehydes to produce amines.
3. Third, excess ammonia not reacted with aldehydes and other compounds, is available to be burned with the coal. In the combustion of coal, it has been found that ammonia will reduce Nox formation. It has also been found that if NOx are reduced, then sulfuric acid formation is reduced.

Fourier Transform Infrared Spectroscopy allows for measurement of chemical change. Tests run by three independent laboratories confirm significant chemical change even at 0.2% application rate. Lab tests show a 35% change on test samples. In refining and improving of the fatty acid product, the inventor has understood the role of excess ions of potassium, sodium, and even ammonia on the reactions that take place between the coal and chemical change agent. Excess ions mentioned above act as water softeners and , thus, slow down or stop the exchange reaction. This is the reason one gets lower readings on FTIR tests. One test uses potassium bromide to mix with the coal and chemical change agent.

The tests todate have been made with the following formula:

| Slack wax (Paraffin wax with 11% Paraffin oil) | 46.3% |
|---|---|
| Other wax (Stearic acid) | 2.0% |
| Ammonia (for ph adjustment) AR | 0.2% |
| Titanium Dioxide | 4.5% |
| Water | 47.0% |

Titanium is added to control viscosity and to help the product to be seen after it is applied to the coal. The following range of combinations are claimed.

| Wax (Paraffin wax, slack wax, Alfa Olefins, Fatty Acids) | ½% to 70% |
|---|---|
| Base for ph adjustment (Ammonium hydroxide, Potassium hydroxide Sodium hydroxide) as needed. | 0.2% |
| Water | 30%-99% |

The invention of this application centers around a substance to convert raw coal fines into a synthetic fuel product. This substance, classified as a chemical change agent, contains functional groups which are chemically active and combine with coal to bring about a compositional change.

The process involves combining raw coal fines with chemical change agents (CCAs ). The two substances, the CCA and the raw coal, are then mixed to insure maximum contact to allow a chemical reaction to occur. The CCA and the raw coal mixture is then compressed to form the finished synthetic fuel product. These distinctive conditions were simulated by testing to effectively recreate those found within a synthetic fuel plant.

The chemical combinations of the CCA and raw coal fines can produce a synthetic fuel source with a decidedly different chemical composition than that of a physical mixture of the constituent coal and CCA.

Fourier Transform Infrared spectroscopy was used to analyze to confirm An actual chemical change within the synthetic fuel product. The spectroscopy process allows one to observe the chemical structures of materials. In this case, the analysis was used to search for a difference in spectra among the CCA, raw coal, and synthetic fuel samples. Differences in the spectra of the materials would indicate a chemical change among the materials. These spectral changes could range from differences in intensity at equivalent frequencies to different peak structures at equivalent frequencies.

The analysis spectra displayed an obvious and measureable chemical change between the synthetic fuel product and the raw coal fines. These measureable spectra differences indicate that the synthetic fuel is a product of intricate chemical changes, and not just a physical combination of raw coal and CCA.

The CCA used in the test was white in color at room temperature. It is more viscous than water and it was a chemically reactive organic substance. The synthetic fuel product was created in accordance with conditions similar to those found within a synthetic fuel plant. The dosage was 0.20% by weight. This was accomplished by applying the appropriate amount of CCA to a defined amount of feedstock coal fines.

The raw coal sample was mixed and riffled to garner a small example for analysis representative of a field sample. The raw coal was then reduced in size using a mortar and pestle to pass through a sixty mesh screen. The same process was performed on the synthetic fuel product.

Fourier Transform Infrared Spectroscopy is a test that outlines the certain types of chemical bonds/structures that exist with a certain substance. It works on the premise that differing chemical structures/bonds will adsorb different levels of infrared energy or frequencies. In this way, spectral differences between the absorption of raw coal and that of the synthetic fuel product would indicate differences in amounts kinds of chemical bonds within a structure. These differences would indicate a definite deviation in the chemical composition of the synthetic fuel product from that of the raw coal fines.

The raw coal, synthetic fuel and CCA spectra were obtained with a Perkin Elmer Spectrum One FTIR spectrometer from 0.1 grams of each sample placed in a sample Holder. Thirty two scans of each sample comprised an average to obtain final spectra Described herein. The instrument was set at 4 wave numbers and covered a frequency Range of from 635 to 4000 wave numbers. The greater or lesser number of certain Bonds at a wavelength will lead to a change in the spectra involved. Typical of the Bonds pertaining to raw coal and synthetic fuel products are as follows:

Carbon-Carbon Bonds

Basic organic molecules are constructed of carbon-carbon bonds. These bonds may be either aromatic or aliphatic. Aromatic carbon atoms are joined in a ring structure and involve double bonds among the carbon bonds. The infrared range of interest for these bonds is around 1500-1650 wave numbers. It should be noted that most of the double bond stretching occurs in the range of 1600-1650 wave numbers. any change in the intensity of two spectra or peak spectra in this area would indicate a definite chemical difference between the two substances. Thus, if the synthetic fuel product displays a greater or lesser intensity in this range than the raw coal a chemical change has occurred. Also, peak structure differences in this range would indicate a chemical change.

Carbon-Oxygen Bonds

Carbon-Oxygen bonds adsorb infrared light from 1050-1250 wave numbers. The actual range of absorption will vary depending upon whether or not it is attached to an aliphatic or aromatic carbon base.

Any change in intensity of two spectra or peak structure in this area indicates a definite chemical difference between the two substances. Thus, if the synthetic fuel product displays a greater or lesser intensity in this range than the raw coal a chemical change has occurred. Also, peak structure differences in this range would indicate a chemical change.

Carbon-Hydrogen Bonds

These bonds are prominent in aliphatic carbon structures with peak absorption infrared light at around 1360 and 1430-1470 wave numbers. In aromatic carbons, the carbon-hydrogen bonds absorb infrared light from about 650-925 wave numbers.

Any change in intensity of two spectra or peak structure in this area would indicate a definite chemical difference between two substances. Thus, if the synthetic fuel product displays a greater or lesser intensity in this range than the raw coal a chemical change has occurred. Also, peak structure differences in this range would indicate a chemical change.

Figure 5:
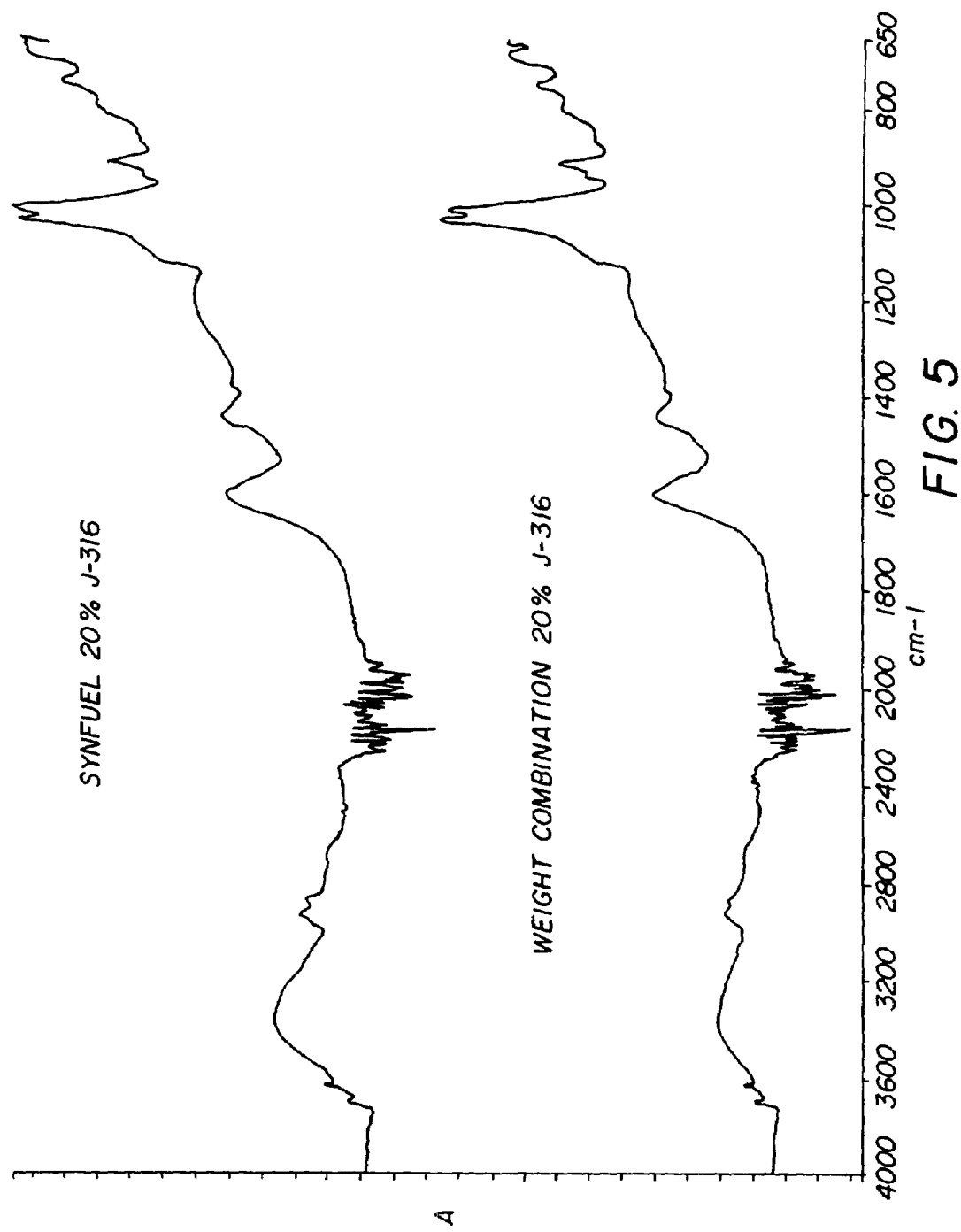
FIG. 5 is a graph showing the comparison between CCA spectra and the Synthetic fuel product.
Figure 6:
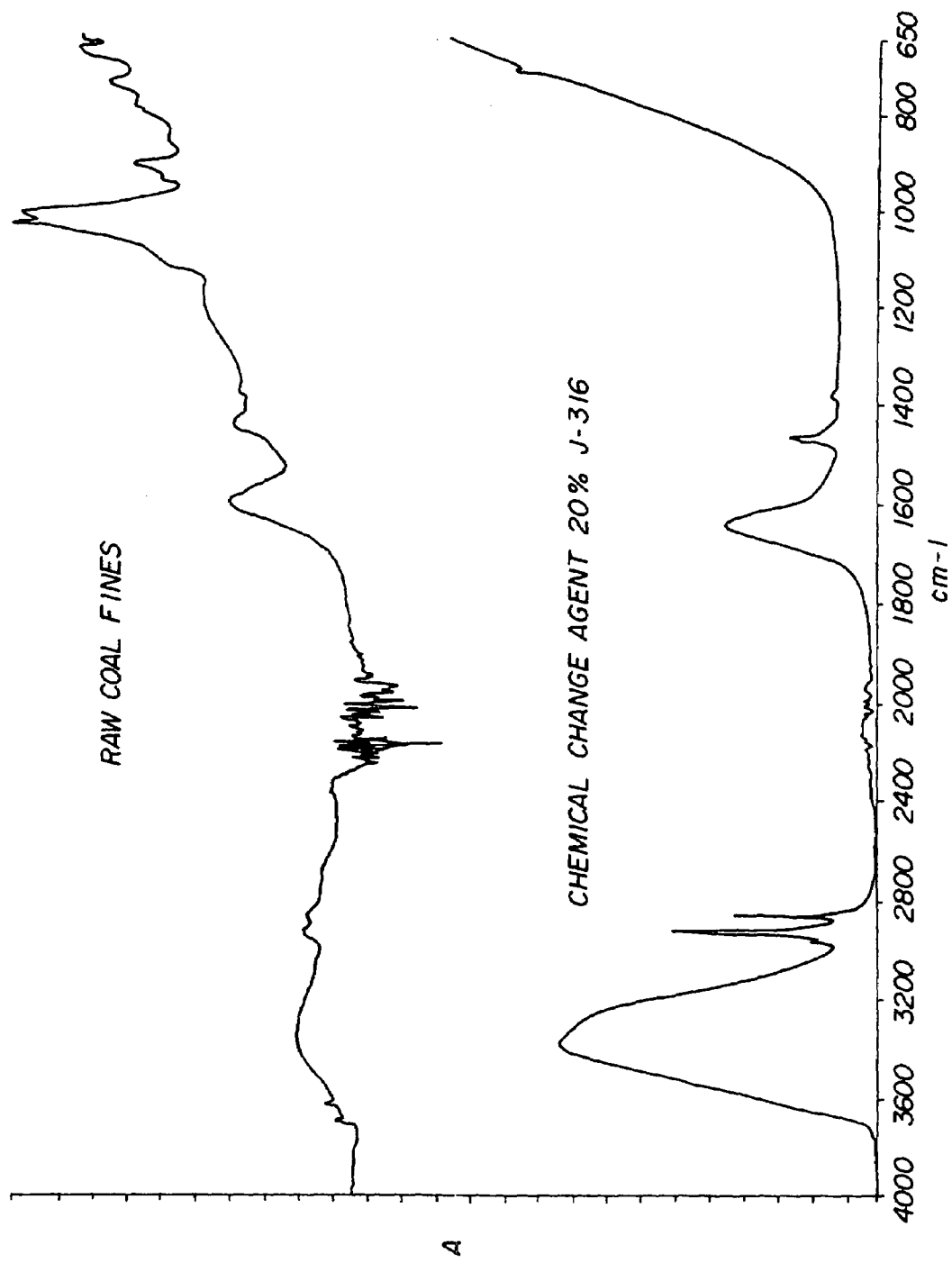
FIG. 6 is a graph showing the comparison between the CCA spectra and the Raw coal fines.

The results of the spectroscopy analysis is shown in FIGS. 5 and 6. There, the synthetic fuel contained 20% wt. of CCA and 99.80% wt. of raw coal. In order to contstruct a weight combination spectra the CCA spectra was multiplied by 0.0020 and The raw coal spectra was multiplied by 0.9980. These two spectra were then added together to form the Weight Combination spectra. This addition accounts for the percentage of CCA and raw coal within the sample itself.

Thus, a difference in the weight combination spectra and the spectra of the synthetic fuel product indicates a difference in chemical bonds associated with each spectra. Therefore, a change in the weight combination spectra as compared to the synthetic fuel spectra would serve as evidence that an actual chemical change has occurred in the formation of the synthetic fuel (the weight combination spectra illustrates what would simply be a physical combination of raw coal and CCA.)

In this particular analyzation, the synthetic fuel spectra is significantly and measurably different from the spectra of the weight combination spectra using the prescribed CCA. The calculated mathematical difference between the weight combination spectra and that of the synfuel spectra totaled a net 30% change. This difference confirms the claim that the synthetic fuel product is the production of chemical change(s) and not merely a physical mixture.

Spectral changes that point to chemical reactions and change include:

1. An increase in absorbance of the doublet peak at around 1050 wave numbers. this area is associated with carbon-oxygen bonds. The increase in the synthetic fuel's absorbance in this area indicates a differing type of bonding than that of a physical mixture. (weight combination).
2. An increase in absorbance at 1600 wave numbers. This area is associated with aromatic carbon-carbon bonds. This indicates that the synthetic product has more aromatic carbon-carbon bonds than a physical mixture would have.
3. An increase in absorbance at 2900 wave numbers. This area is associated with an absorbance associated with carbon-hydrogen bonds. The synthetic fuel product displays a larger number of these bonds than those that would be found in a physical mixture.
4. An increase in absorbance at 1440 wave numbers. This is an area of absorbance associated with carbon-hydrogen bonds as well. The synthetic fuel product displays a larger number of these bonds than those that would be found in a physical mixture.

The Fourier Transform Infrared Spectroscopy analysis of raw coal fines, synthetic fuel product and chemical change proves that several significant chemical changes occurred when raw coal fines were combined with the chemical change agent to create a synthetic fuel product. The synthetic fuel product is another entity entirely when compared with the raw coal fines and the physical combinations of the raw coal fines with the chemical change agent.

Further tests were conducted using the FTIR analysis, thermo-gravimetric analysis, (TGA), ASTM proximate analysis, and heating value determination. The TGA analysis indicated that a peak pyrolysis rates of mass loss are significantly different (26.4%) for the fuel product and simple mixtures of the ingredients. This is evidence of significant chemical changes in the fuel product. Good correlation between the levels of ash and sulfur for the feed and product obtained from proximate analysis results, suggests that no significant processing or sampling errors likely occurred with the collection of the samples. Further testing showed that an average difference in measured peak areas (as shown in FIGS. 5 and 6) using FTIR of 16% provides evidence of overall significant change in chemical composition between parent materials and fuel product. The TGA results indicate that peak pyrolysis rates of mass loss are significantly different (36.6%) for the fuel product and the simple mixture of parent ingredients. Further proximate analysis results show that the difference in fixed carbon and volatiles contents between the fuel product and simple ingredients mixture (1.41%) are significantly different.

Tests were also run on a synfuel to be used as a combustible fuel additive to enhance complete combustion and reduce NOX in combustion gases. This fuel additive can be used separately as a chemical change agent or as a NOx reduction agent or as both. Specifically the following compositions proved successful.

Composition to enhance complete combustion and reduce NOX in combustion gases.

| | |
|---|---|
| Slack Wax | 0-60% |
| Fatty Acid | .5%-10% |
| Ammonia | .2%-2% |
| Ammonia like compounds (Amide, Amines, Amino Acid and other chemical compounds containing at least one NH2 functional group) | 0%-60% |
| Water | 42%-90% |

Composition for use as a combustible fuel additive.

| | |
|---|---|
| Slack Wax | 11% |
| Fatty Acid (Stearic Acid) | 3.5% |
| Amide (Urea) | 20% |
| Ammonia | .5% |
| Water | 65% |

The following composition works both as a chemical change agent to enhance complete combustion and to reduce NOx in combustion gases.

| | |
|---|---|
| Hydrocarbon wax | 0%-60% |
| Fatty acid | 0%-10% |
| Ammonia | 0%-2% |
| Ammonia like compounds | 0%-60% |
| Water | 30%-90% |

In the above formulation, a percentage of wetting agents are added to promote penetration into the coal. Can use Igepal CO-630 in 0-5% concentrations, but other wetting agents may be used. Titanium dioxide in the range of 0-10% concentration is added to promote NOx reduction.

A chemical change agent for use as a coal treatment.

| | |
|---|---|
| Hydrocarbon wax | 11% |
| Fatty acid | 3.50% |
| Ammonia | 0.5% |
| Amide (Urea) | 20% |
| Water | 65% |

A chemical change agent for use on coal, wood and waste tires. The methodology where solid fuels are treated with chemical compositions so as to reduce NOx in combustion gases. In this composition, a percentage of the wetting agents are added to promote penetration into the fuel. Current used is Igepal CO-630 in 0-5% concentrations, but other wetting agents may be used. Titanium dioxide is added in a concentration of 0-10% concentration to promote NOx reduction.

| | |
|---|---|
| Hydrocarbon wax | 0-60% |
| Fatty acid | 0-10% |
| Ammonia | 0-2% |
| Ammonia like compounds | 0-60% |
| Water | 30-90% |

A chemical change agent for use on coal, wood, waste tires and other solid fuels. The Methodology where solid fuels are treated with chemical compositions so as to reduce NOx in combustion gases.

| | |
|---|---|
| Hydrocarbon wax | 11% |
| Fatty acid | 3.50% |
| Ammonia | 0.5% |
| Amide (Urea) | 20% |
| Water | 65% |

The chemical change agent that can be added to any chemical compound that it is compatible with and used on coal or other fuels to promote NOx reduction in the resultant combustion gases or to improve chemical change results for purposes of the Section 29 of the Code of Federal Regulations (CFRs) tax credits. The chemical change agent is comprised of various ratios ranging from 1 to 6 parts of active chemical change reagent to 1 to 20 parts of NOx reducers listed below. In addition NOx reducers can be applied with or without chemical change reagents or in any combination of the components listed below using the unique methodology of application listed heretofore. Tax credits are obtained from the U.S. Treasury Department with Private Letter Rulings (PLRs).

A NOx reducer composition is as follows:

| | |
|---|---|
| Ammonia | 0-2% |
| Water | 30-95% |
| Ammonia like compounds Amides, Amines, Amino acid and other chemical compounds which contain at least one NH, NH2, or NH3 functional group | 0-60% |
| Titanium Dioxide | 0-10% |

In the method where ammonia or ammonia like compounds are added to coal prior to burning the solution is as follows: (This solution is added to the coal before it is ground)

| | |
|---|---|
| Ammonia | 0-2% |
| Wetting agent | 0-5% |
| Water | 30-95% |
| Ammonia like compounds Amides, Amines, Amino acid and other chemical compounds which contain at least one NH, NH2, or NH3, functional group | 0-60% |
| Titanium Dioxide | 0-10% |

A chemical composition comprised of 1-6 parts of active chemical change reagent and 1-20 parts of NOx reducing additive.

| | |
|---|---|
| Hydrocarbon was | 0-60% |
| Fatty acid | 0-10% |

-continued

| | |
|---|---|
| Ammonia | 0-2% |
| Water | 30-90% |

Again, the ammonia like compounds are ground into dust with coal so as to distribute the NOx reducing chemicals evenly throughout the coal. The finer the NOx reducer is ground the more evenly distributed the better NOx reduction will be. The Titanium Dioxide is added to coal before grinding to promote NOx reduction.

Catalytic compounds are added to the chemical change reagent or to the coal (or other fuel feestock) directly, before or during combustion in order to promote and/or enchance NOx reduction. The most effective catalysts should be of small particle size in order to obtain the greatest "surface area to mass" ratio. Catalysts can be blown into the combustion area (flame) or added to the coal (or other fuel feedstock). Known NOx reducing catalysts are Titanium Dioxide, Zeolites, Tungsten Oxide, Vanadium Oxide, Aluminum Silicate, Iron Oxide as well as reacted metals, Iron Compounds and Iron containing compounds and any combination of the above. This treatment, which is unique and novel, can be used in conjunction with "combustion flu gas treatment technology".

In addition, all of the above formulations lend themselves to a reduction in Sulfur Dioxide (SOx) in conjuction with the nitrous oxide (NOx) reductions noted.

FIGS. 7 and 8 show hourly data summaries for the chemical change agent and NOx reducer of this invention.

The accompanying data on FIGS. 7 and 8 show a test of the chemical change agent with NOx reducer. The steady state NOx lbs. per million BTUs was an average of 71 lbs. The invention was applied to the coal at a 0.7% application rate and within an hour of application the NOx emission dropped to 0.58 lbs. per million BTUs. The opacity improved and the range of readings narrowed so that the high and low readings were closer together. The data on FIGS. 7 and 8 shows the averages and toward the end of the test a mixture of blended and unblended coal was used which shows a slight upturn in the readings.

It should be reiterated that the products and emulsions are environmentally friendly and have no hazardous components.

The NOx reducing capabilities herein described are "boiler specific" in that the amount of reduction is dependent on any external contamination, pulverized temperatures, internal boiler temperatures and flue gas temperatures throughout the system including gas temperatures going through the baghouse.

The methods of NOx reduction can be used together or independently from one another. They can be used in conjunction with the chemical change formulaes or independently of the complete chemical change version. There are portions of the chemical change agent formula which are necessary because without those portions the stability of the emulsion cannot be maintained and the portions are listed in the claims and in the specification.

The first class of NOx reduction occurs with the ammonia and urea and any other ammonia like products. It works in the approximate temperature ranges of 1,800 to 2100 degrees Fahrenheit. The majority of the pulverizers heat coal up to about 180 degrees Fahrenheit. No problems are created, however, as some power plants are set up specifically to burn low volatile coal, which is atypical. In these plants superheated air (at 500 degrees F) is added to the pulverizer in order to remove all moisture. In the course of doing this, these NOx reducers are volatized and destroyed or discarded.

The second class of NOx reducers are catalysts, including titanium dioxide, which work in the temperature range typically of 500 to 850 degrees Fahrenheit. These can be modified to work as high as 1,000 degrees Fahrenheit. The catalysts work in the flue gases but, as they collect in the baghouse, they accumulate and, in essence, work like the catalytic converter in a car. The more that accumulates in the baghouse, the better the NOx reduction.

A "baghouse" is a filtering mechanism to filter the particulates out of the air stream of the stack gases.

Figure 9:
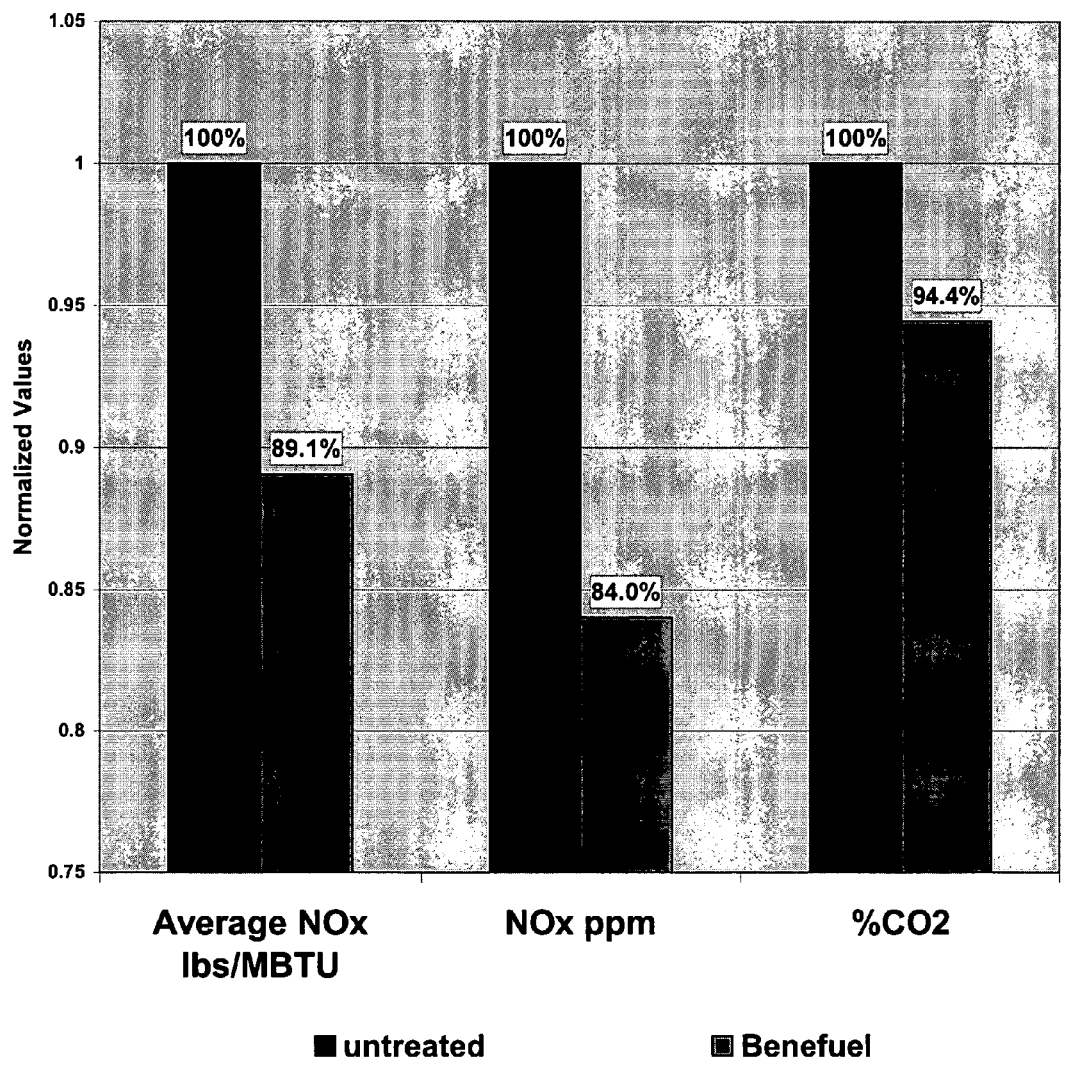
FIGS 9 and 10 are charts of tests run in Jul. and Nov., 2003, respectively.
Figure 10:
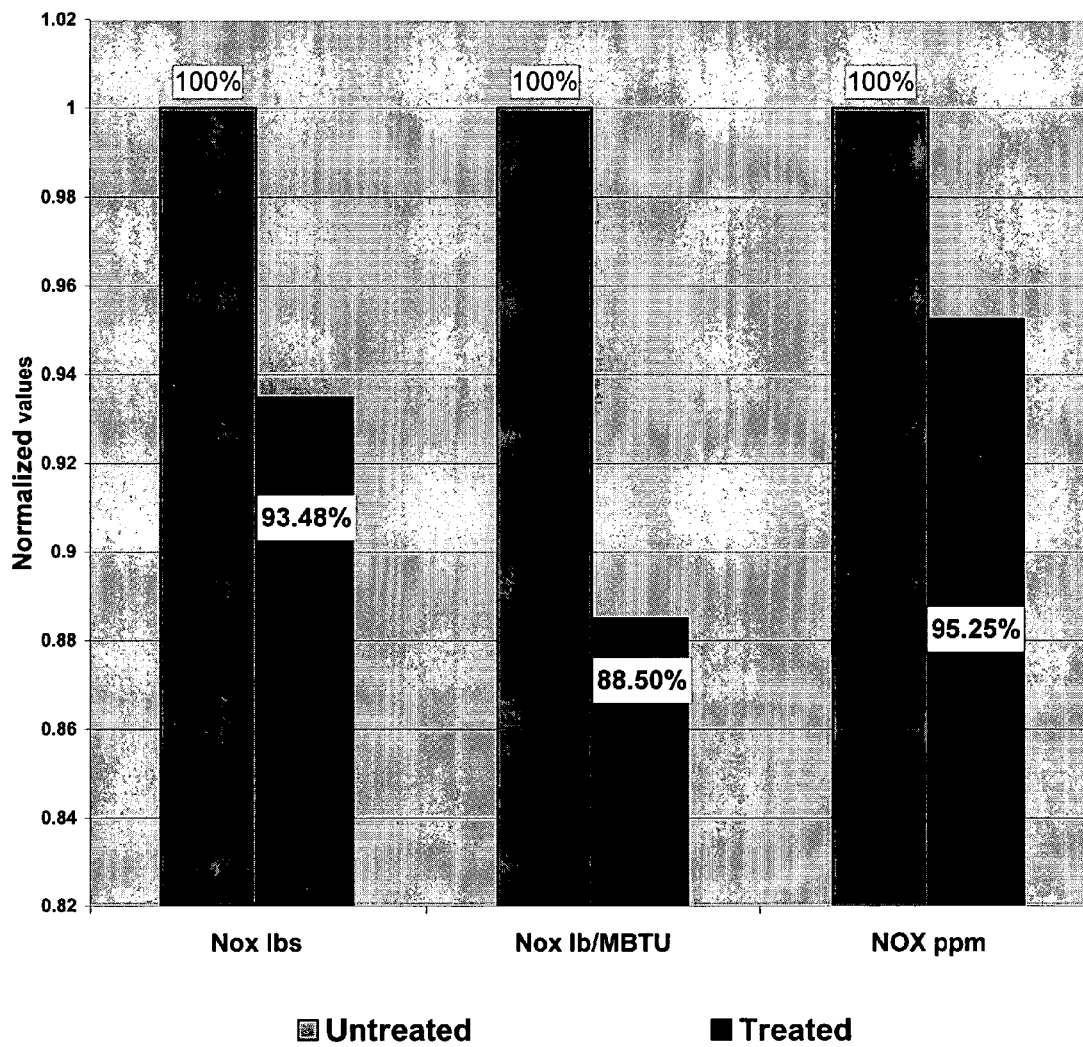

FIGS. 9 and 10 are charts of tests run in July and November, 2003, respectively, showing the product performance of a coal based synfuel. The tests were conducted on a coal fired Steam Utiliy boiler, a 250 MBTU/hr unit operated under original standard burner and Low=NOx burner conditions. The objective of the test was to demonstrate the NOx reduction capability of the instant formulation applied directly to the coal. The product is designed to effect chemical change of the coal to qualify as a synthetic fuel as well as to reduce the NOx emissions from the combustion of treated coal. The emission performance of NOx, CO2 and observations are discussed in the following paragraphs.

The test was run in two separate stages, one in July and one in November, 2003. Each test was conducted on a 250 MBTU coal-fired steam utility boiler operated at a pulverized coal facility boiler plant site. The first test was conducted with a standard burner configuration as originally installed in the unit. The second test was conducted after a low-NOx burner upgrade was completed. The application location was varied as well. In July, the compound was added to the coal as it was fed to the feed bin in the standard burner test and for the low-NOx burner test, in November, it was added to the coal as it was loaded onto rail cars.

FIG. 11 shows a table summarizing the test conditions.

July 2003 Test

This test involved an application system consisting of a spray nozzle manifold fed from totes of product via an air powered progressive cavity pump. The spray nozzle manifold was mounted such as to spray the product on the coal as it traversed the feed conveyer into a specified boiler feed bin. The bin fill rate was monitored by the coal unitily plant's boiler equipment utilizing a continuous weight scale. The coal burned before the treated coal start was the same as the treated product type. The application rate was monitored and maintained constant flow rates measured by a digital flow meter and documentation. The product was applied at a rate of 0.8% by weight (16 lbs. of product per ton of coal). It was noted the product wet the coal as designed and was absorbed such that no excess residue was observed. More coal was treated and a block of of summarized data was produced containing boiler performance parameters and emission data.

Figures 13, 14:
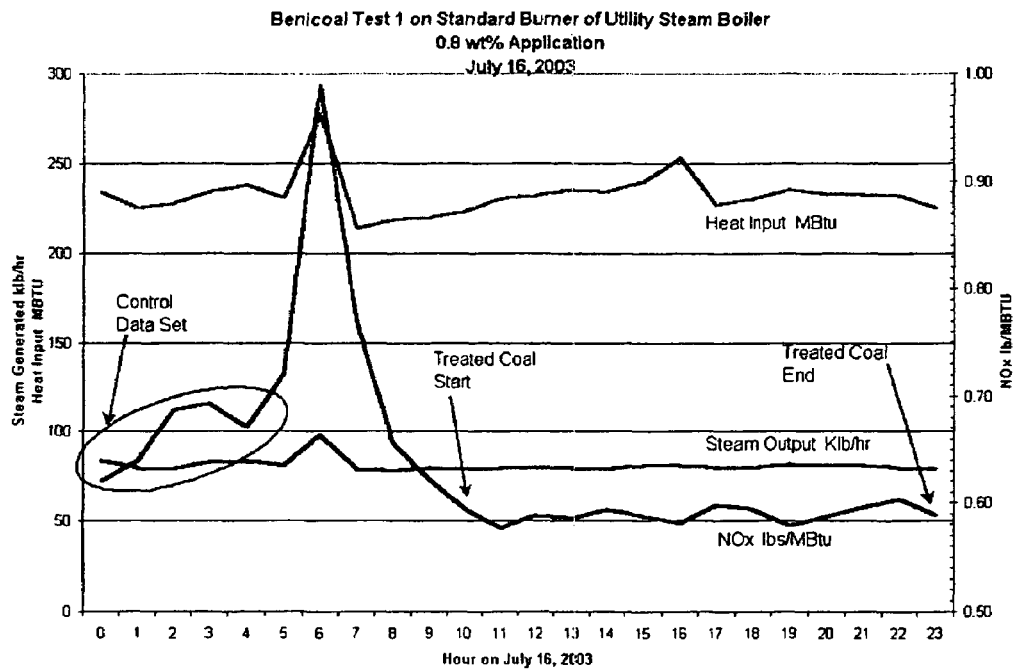
FIG. 13 shows the response of the steam output, heat input and NOx formation.
FIG. 14 shows a summary of the results from the Nov., 2003 test.

FIG. 12 shows a table summarizing the performance on the product and FIG. 13 shows the response of the steam output, heat input and NOx formation for each hour of the day. The control set is defined as the six contiguous data points comprised from 0 am to 5 am. While there were some variations, the test proved successful. Coal was introduced in the morning and 136 tons of coal were tested for 13.5 hours. The data shows that 95% of heat input, steam input, and stack flow data remain with a +/−10 range of average for each parameter. A difference was noted in the treated coal and the untreated coal and the variability of boiler and NOx emission parameters was noticeably greater for the untreated coal compared to the treated coal. The test successfully demonstrated the NOx reduction of 11% as determined by NOx/mmbtu, relative to the control set with all other parameters consistent. There was also a decrease in $CO_2$ of 5.5% Product performance was expected for this formulation and 0.8% weight application rate.

November 2003 Test

This test was conducted at a pulverized coal utility boiler plant site. The product application system consisted of a spray nozzle manifold fed from totes of product via an air powered progressive cavity pump. The spray nozzle was mounted in such a way as to spray the product on the coal as it exited the feed conveyer into rail cars indexed into position. Each car was filled with 100 tons of coal. Ten rail cars were used filled with material comprising a total of 1000 tons. The test called for the first 200 tons to be untreated, the next 400 tons treated to produce the product (chemical change agent) and the remaining 400 tons left untreated. Normal procedures were used to unload the cars insuring that the material was segregated as designed in the test protocol. The product and coal experienced about 3 inches of rainfall at temperatures around 50 degrees F. In the evening the temperature reached a low of 25 degrees F. This tracking of weather data showed that the "sealing" characteristics: of the product would stand up to normal weather events.

A summary of the results from these tests is shown in the table of FIG. 14 comparing the performance of the untreated coal to the product. NOx emissions in the form of lbs. NOx/MBTU were reduced 12.9% with the introduction of the product. An additional observation was the expected NOx reduction on a Low NOx Burner platform.

Other tests have been run by Combustion Resources of Provo, Utah in April 2003 and the tests showed that significant chemical changes took place in the fuel product relative to the parent materials. Significant differences in the spectral characteristics of IR peaks representing carbonyl groups, OH bonded C=O groups, carbon-oxygen bonding, alkenes, aldehydes, ketones and in the polycide aromatic skeletal structure were noted. An average difference in measured peak areas using FTIR of 19% provides evidence of an overall significant change in chemical composition between the parent materials and fuel product. TGA showed the the peak and high-temperature pryrolysis rates of mass losss are significantly different (5% and 7.8%, respectively) for the fuel product relative to a simple mixture of parent ingredients. This is further evidence of a chemical change in the product.

Other tests run by Mineral Labs, Inc. of Kentucky show that in a test where the product was applied to raw coal fines at a dosage of 0.25% by weight, the total net chemical change measured via FTIR spectroscopy was 31% at the applied dosage. This constitutes a significant chemical change including carbon, oxygen and hydrogen bonds. When the dosage was increased to 0.30% by weight, the chemical change was 29% at the applied dosage.

When R&D Consulting, LLC of Illinois tested the product it found that coal was statistically chemically different than the parent coal used to produce it. The parent coal was mixed with the chemical change agent constituting this invention. This qualifies the coal as a "synthetic fuel".

A test run by Paspek Consulting, LLC of Ohio, showed that the mixing of the product with bituminous coal from the Appalachian area provided evidence of bonding or chemical change. The samples were analyzed by Fourier Transform Infared (FTIR) techniques to determine the relative concentration of various types of chemical bonds in the samples.

Having described the preferred embodiments of the invention, it will be obvious to those or ordinary skill in the art that many modifications and changes can be made without departing from the scope of the appended claims.

The invention claimed is:

1. A synfuel composition for use as a combustible fuel additive to enhance complete combustion and to reduce NOx in combustion gases, said composition consisting essentially of the following by weight:

| | |
|---|---|
| A Slack Wax | 11% |
| Stearic Acid | 3.5% |
| An Amide | 20% |
| Ammonia | .5% |
| Water | 65%. |

2. A chemical composition for use as a combustible fuel additive, said composition consisting essentially of the following by weight:

| | |
|---|---|
| A Slack Wax | 11% |
| A Fatty Acid | 3.5% |
| An Amide | 20% |
| Ammonia | .5% |
| Water | 65%. |

3. A chemical composition as in claim 2 wherein said fatty acid is stearic acid.

4. A chemical composition as in claim 2 wherein said amide is urea.

5. A chemical change reagent for use as a coal treatment, said reagent consisting essentially of the following by weight:

| | |
|---|---|
| a Hydrocarbon wax | 11% |
| a Fatty Acid | 3.5% |
| Ammonia | .5% |
| An Amide | 20% |
| Water | 65%. |

6. A chemical change reagent as in claim 5 wherein said amide is urea.

7. A chemical change agent for use on wood, coal and waste tires to treat said substances so as to reduce NOx in combustion gases, said agent consisting essentially of the following by weight:

| | |
|---|---|
| a Hydrocarbon wax | 11% |
| a Fatty acid | 3.5% |
| Ammonia | .5% |
| an Amide | 20% |
| Water | 65%. |

8. A chemical change agent as in claim 7 wherein said amide is urea.

9. A method of reducing NOx emissions in the burning of coal, said method comprising providing an NOx reducing chemical chance agent;

adding a catalytic compound to said NOx reducing chemical change agent or to the coal directly before or during combustion, said catalysts being of small particle size; and adding said NOx reducing chemical change agent to said coal prior to or during burning, wherein said catalytic compound is added so that it is placed on the surface of the coal and wherein the catalytic compound works in the flue gases, which includes adding a wetting agent to said coal and agent mixture; wherein said catalytic compound is Titanium Dioxide.

10. A method as in claim 9 wherein said coal/agent mixture is ground finely into a dust to promote even distribution.

11. A method of reducing NOx emissions in the burning of coal, said method comprising
providing an NOx reducing chemical change agent;
adding a catalytic compound to said NOx reducing chemical chance agent or to the coal directly before or during combustion, said catalysts being of small particle size; and
adding said NOx reducing chemical chance agent to said coal prior to or during burning,
wherein said catalytic compound is added so that it is placed on the surface of the coal and wherein the catalytic compound works in the flue gases,
wherein said NOx reducing chemical change agent is a composition consisting essentially of the following by weight:

| | |
|---|---|
| a Hydrocarbon wax | 0-60% |
| a Fatty acid | 0-10% |
| Ammonia | 0-2% |
| Ammonia like compounds selected from the group consisting of Amides, Amines, Ammo acid and other chemical compounds which contain at least one NH, NH$_2$ or NH$_3$ functional group | 0-60% |
| Water | 30-90%; | wherein said catalytic compound is Titanium Dioxide.

12. A method of reducing NOx in combustible emissions, said method comprising:
providing a source of combustible material,
adding a NOx reduction agent or reagent to said material prior to burning,
said adding involving distributing said agent or reagent uniformly throughout the combustible material to provide a combustible mixture, burning said mixture so as to provide a reduction in NOx from that produced if said combustible material was burned by itself,
wherein said NOx reduction agent or reagent consists essentially of the following by weight:

| | |
|---|---|
| a Hydrocarbon wax | 0-60% |
| a Fatty acid | 0-10% |
| Ammonia | 0-2% |
| Urea | 10%-60% |
| Water | 30-90%. |

13. A method as in claim 12 wherein said material is coal.

14. A method as in claim 13 wherein said material is bituminous coal.

15. A method as in claim 12 wherein said NOx reduction reagent consists essentially of the following by weight:

| | |
|---|---|
| a Hydrocarbon wax | 11% |
| a Fatty acid | 3.5% |
| Ammonia | 0.5% |
| Urea | 20% |
| Water | 65%. |

16. A method as in claim 15 wherein said fatty acid is stearic acid.

17. A method as in claim 15 wherein said reagent further comprises Titanium Dioxide.

18. A method as in claim 12 wherein said mixing step includes grinding said material to dust as the reagent is added thereto.

19. A method as in claim 18 wherein said material is coal.

20. A method as in claim 12 further comprising the step of adding a wetting agent to said material prior to addition of said agent or reagent.

21. A synfuel meeting the requirements of Section 29 of the Internal Revenue Code definition of a "synfuel", said synfuel consisting essentially of coal which has been treated with and which has chemically reacted with a chemical change agent composition consisting essentially of the following by weight:

| | |
|---|---|
| a Slack wax | 11% |
| a Fatty Acid | 3.5% |
| an Amide | 20% |
| Ammonia | .5% |
| Water | 65%. |

22. A synfuel as in claim 21 wherein said Fatty Acid is stearic acid.

23. A synfuel as in claim 21 wherein said Amide is urea.

24. A synfuel as in claim 21 wherein said composition also includes a NOx reducing agent for aiding in reducing NOx emissions when said coal is burned.

25. A synfuel as in claim 24 wherein said NOx reducing agent is selected from the group consisting of:
Aluminum Silicate
Vanadium Oxide
Tungsten Oxide
Titanium Dioxide
Iron Oxide as well as other Iron containing material or compounds that form Iron Oxide in a combustion zone, and combinations of the foregoing.

26. A method as in claim 12 wherein said NOx reduction agent or reagent further comprises an agent selected from the group consisting of:
Aluminum Silicate
Vanadium Oxide
Tungsten Oxide
Titanium Dioxide
Iron Oxide as well as other iron containing compounds, and combinations of the foregoing.

27. A method as in claim 12 wherein said NOx reduction agent or reagent further comprises Titanium Dioxide.

* * * * *

UNITED STATES PATENT AND TRADEMARK OFFICE
CERTIFICATE OF CORRECTION

PATENT NO.       : 7,651,541 B2  Page 1 of 1
APPLICATION NO. : 10/790545
DATED            : January 26, 2010
INVENTOR(S)      : Hundley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1519 days.

Signed and Sealed this

Twenty-third Day of November, 2010

David J. Kappos
*Director of the United States Patent and Trademark Office*